United States Patent
Kojima

[11] Patent Number: 6,081,277
[45] Date of Patent: *Jun. 27, 2000

[54] APPARATUS AND METHOD FOR CONTROLLING IMAGE DISPLAY

[75] Inventor: Kiyonobu Kojima, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/719,793

[22] Filed: Sep. 25, 1996

[30] Foreign Application Priority Data

Sep. 28, 1995 [JP] Japan ................................. 7-250539

[51] Int. Cl.⁷ .................................................. G06F 15/20
[52] U.S. Cl. ............................................................ 345/439
[58] Field of Search ................................... 345/433, 430, 345/127, 129, 131; 705/508

[56] References Cited

U.S. PATENT DOCUMENTS

| | | | |
|---|---|---|---|
| H997 | 11/1991 | Bronson ................................... | 345/127 |
| 4,149,184 | 4/1979 | Giddings et al. .......................... | 358/81 |
| 4,734,619 | 3/1988 | Havel ....................................... | 313/510 |
| 4,790,028 | 12/1988 | Ramage .................................... | 382/47 |
| 4,893,258 | 1/1990 | Sakuragi .................................. | 345/439 |
| 4,924,299 | 5/1990 | Mizuno et al. ........................... | 358/22 |
| 5,187,776 | 2/1993 | Yanker ..................................... | 395/157 |
| 5,365,254 | 11/1994 | Kawamoto ............................... | 345/131 |
| 5,371,512 | 12/1994 | Otake et al. ............................. | 345/114 |
| 5,426,725 | 6/1995 | Kilgore .................................... | 395/147 |
| 5,448,685 | 9/1995 | Ogura et al. ............................. | 707/508 |
| 5,450,538 | 9/1995 | Glaser et al. ............................ | 707/508 |
| 5,473,737 | 12/1995 | Harper ..................................... | 395/131 |
| 5,500,922 | 3/1996 | Shimura et al. .......................... | 345/439 |
| 5,553,209 | 9/1996 | Johnson et al. .......................... | 345/433 |
| 5,638,523 | 6/1997 | Mullet et al. ............................. | 395/326 |
| 5,670,984 | 9/1997 | Robertson et al. ....................... | 345/439 |
| 5,745,122 | 4/1998 | Gay et al. ................................. | 345/433 |

FOREIGN PATENT DOCUMENTS 4-337800  11/1992  Japan ................................ G09G 5/36

*Primary Examiner*—Mark R. Powell
*Assistant Examiner*—Huedung X. Cao
*Attorney, Agent, or Firm*—Limbach & Limbach L.L.P.

[57] ABSTRACT

An apparatus and a method for controlling image display arranged to enable an entire image to be recognized in one window. Image data is compressed in the direction of width so that the width defined by the image data is adjusted to the width of the window. Image data thereby compressed is is divided with respect to first to third storage areas. An image corresponding to the second storage area is directly displayed in a second display area in the window. Images corresponding to the first and third storage areas are displayed in first and third display areas in the window by being compressed in the vertical direction.

20 Claims, 23 Drawing Sheets

APPARATUS AND METHOD FOR CONTROLLING IMAGE DISPLAY

BACKGROUND OF THE INVENTION

1. Field of the Invention

The present invention relates to an apparatus and a method for controlling image display and, more particularly to an image display controller and an image display control method arranged to display one frame of image in a restricted display area (window) so that the entire image can be looked over.

2. Description of the Related Art

FIG. 26 is a diagram of the relationship between an image data area defined as the entire area of one frame of image and a display area of a window in which the image is displayed in a conventional manner. If the image data area is larger than the display area, only a portion of the image data area is displayed, as illustrated in FIG. 26.

FIG. 27 is an example of a display made in this manner. A window 2 is displayed on a display screen 1, and predetermined letters are displayed in the window 2. In the case of display illustrated in FIG. 27, a partial displayed area in the image data area shown in FIG. 26 is cut out to be displayed in the window 2 since the entire image data area cannot be displayed in the window 2.

In the case of display illustrated in FIG. 27, while a portion of one frame of image is displayed in the window 2 having a restricted size, scroll bar areas 4 and 7 are provided in right and lower end portions of the window 2 and bars having lengths corresponding to the display area are displayed in the bar areas 4 and 7 to enable the presently-displayed area to be intuitively recognized. In the example illustrated in FIG. 27, the length of each of the hatched areas indicates the range in which part of the area of one frame of image is displayed in the window 2.

An up button 5 and a down button 6 are provided respectively at the upper and lower ends of the scroll bar area 4 while a left button 8 and a light button 9 are provided respectively at the left and right ends of the scroll bar 7. Each of these buttons is pointed at with a cursor and operated through the operation of a mouse or the like to scroll the displayed area in the vertical or horizontal direction.

FIG. 28 shows an example of a display of one frame (one page) of image of A4 size in window 2. In this example, as illustrated, only an upper portion of the A4 image is displayed while the other portion close to the lower side is cut and undisplayed.

As described above, when one frame of image is displayed by a conventional display apparatus, only a portion of the image is displayed and the displayed area is scrolled if it is necessary to see the other portion of the image. The position of the actually displayed area in the entire image is indicated by the scroll bars.

However, the scroll bars are provided in very narrow areas in the vicinity of the ends of the window, so that it is difficult to speedily and correctly recognize the entire area from which the displayed area is selected.

In the case of display illustrated in FIG. 28, the image is displayed so that, in its lower position, continuous lines end at the lower end of the window. In this situation, it can easily be understood that a certain image portion is undisplayed as if it is hidden below the end of the window. However, in a situation where no image portion ends at this end of the window, the existence of the undisplayed area below this position may be overlooked. In searching a predetermined article or the like displayed in a similar manner, therefore, the possibility of missing a target is not negligible.

SUMMARY OF THE INVENTION

In view of these circumstances, an object of the present invention is to provide an image display controller and an image display control method arranged to enable the entire area of one frame of image to be recognized speedily and reliably and to reduce the possibility of a search miss or the like.

To achieve this object, according to one aspect of the present invention, there is provided an apparatus for controlling image display comprising comparison means for comparing at least one of a length in the vertical direction and a length in the horizontal direction of one frame of image with a length of a window in the corresponding direction, compression means for adjusting the length of the frame of image to the length of the window in the corresponding direction by compressing at least a portion of the frame of image in the direction of the length if the length of the frame of image is larger than the length of the window in the corresponding direction, the other portion of the frame of image being not compressed in the corresponding direction, and output means for outputting the frame of image having the portion compressed by the compression means and the other portion not compressed by the compression means.

According to another aspect of the present invention, there is provided a method of controlling image display comprising the steps of comparing at least one of a length in the vertical direction and a length in the horizontal direction of one frame of image with a length of a window in the corresponding direction, and displaying the entire frame of image in the window by compressing at least a portion of the frame of image in the direction of the length if the length of the frame of image is larger than the length of the window in the corresponding direction, the other portion of the frame of image being not compressed in the corresponding direction.

In the above-described apparatus for controlling image display, comparison means compares at least one of the length in the vertical direction and the length in the horizontal direction of one frame of image with the length of the window in the corresponding direction. The compression means adjusts at least one of the lengths of the frame of image to the length of the window in the corresponding direction by compressing at least a portion of the frame of image in the direction of the length if the length of the frame of image is larger than the length of the window in the corresponding direction, the other portion of the frame of image being not compressed in the corresponding direction. The output means outputs the frame of image having the portion compressed by the compression means and the other portion not compressed by the compression means.

In the above-described method of controlling image display, at least one of the length in the vertical direction and the length in the horizontal direction of one frame of image is compared with the length of the window in the corresponding direction, and the entire frame of image is displayed in the window by compressing at least a portion of the frame of image in the direction of the length if the length of the frame of image is larger than the length of the window in the corresponding direction, the other portion of the frame of image being not compressed in the corresponding direction.

DESCRIPTION OF THE PREFERRED EMBODIMENT

Figure 1:
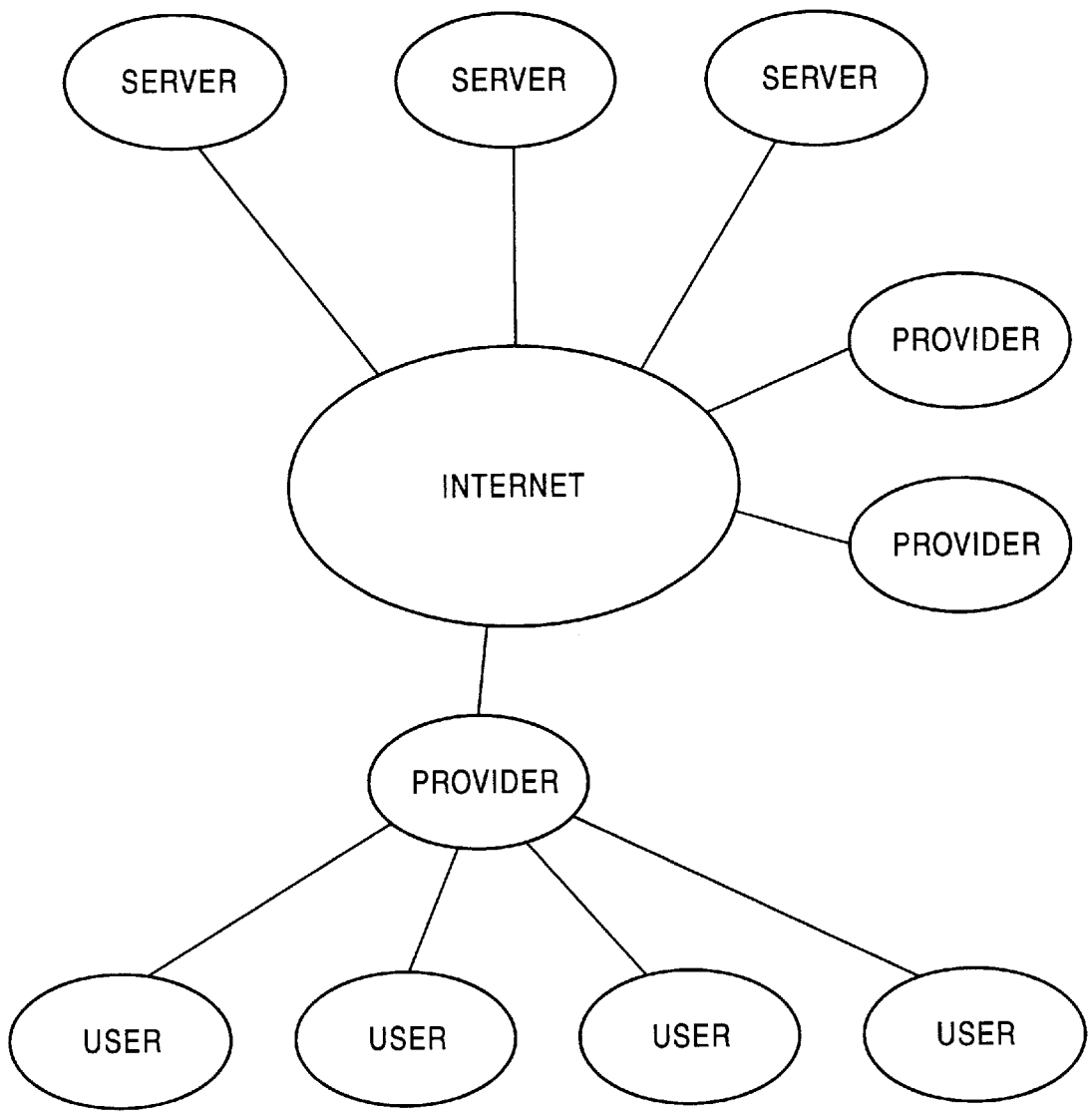
FIG. 1 is a diagram of a network to which an image display controller of the present invention is connected.

FIG. 1 shows the configuration of an example of a network to which an image display controller of the present invention is connected, and which is the Internet provided as a computer network connected in a world-wide scale. To the Internet, as shown in FIG. 1, many servers and many providers are connected. The servers provide users with various kinds of information and service and the providers provide service for enabling users to access the Internet.

Figure 2:
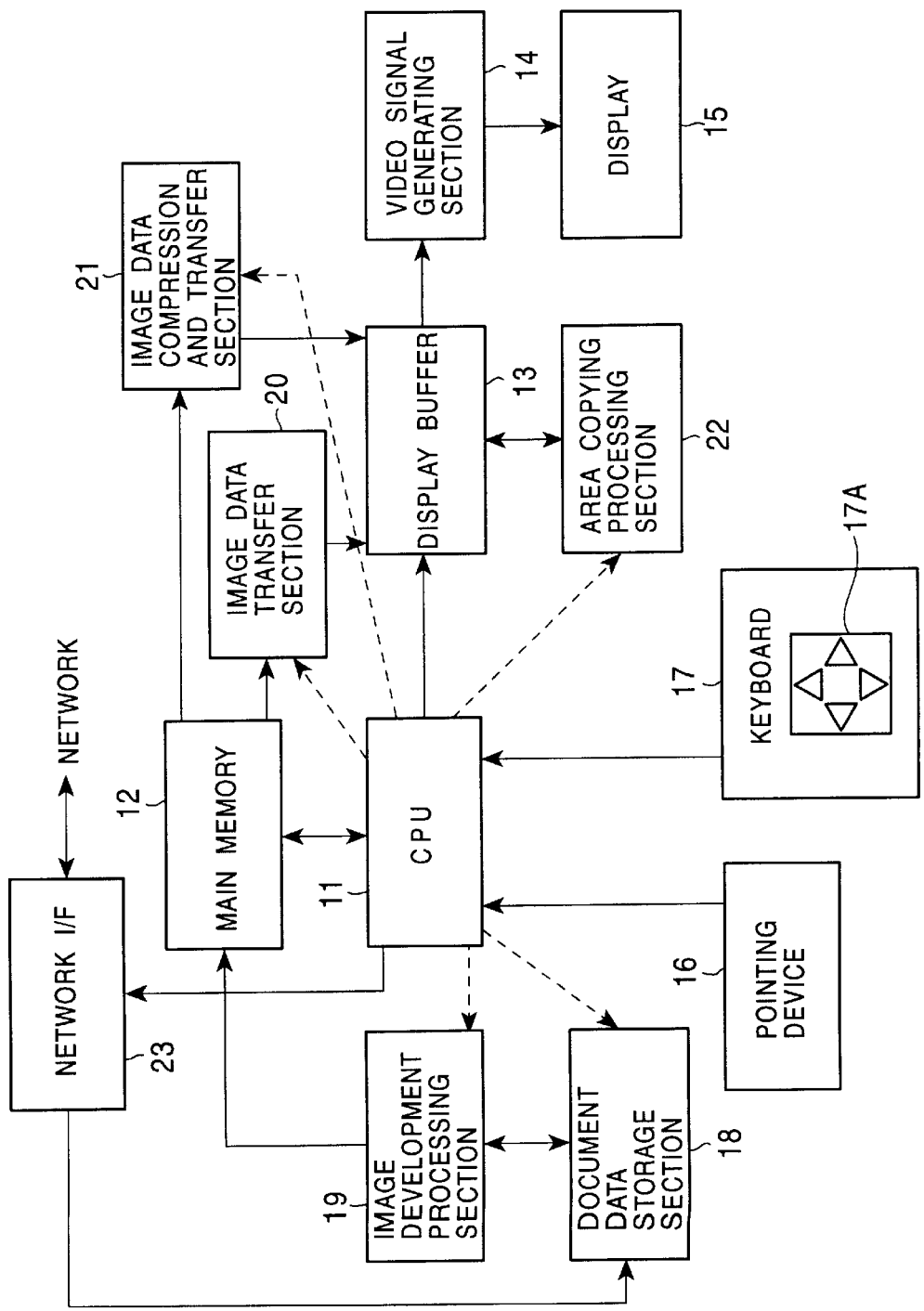
FIG. 2 is a block diagram showing the configuration of an embodiment of the image display controller of the present invention.

FIG. 2 is a block diagram showing the configuration of an embodiment of the image display controller of the present invention. In this embodiment, a network interface (I/F) 23 receives data supplied from the Internet and other networks and supplies the received data to a document data storage section 18 to store the data. The document data storage section 18 can be formed of a hard disk, an optical disk, a magneto-optical disk, a solid-state memory or the like. The structure of date stored in the document data storage section 18 can be that of image data or document data compressed by modified modified READ (MMR), modified Huffman (MH), that of a page description language such as Postscript used for desktop publishing (DTP), and the like.

An image development processing section 19 is arranged to develop data stored in the document data storage section 18 into image data in a bit-map form or the like according to the data structure and to output the developed data to a main memory 12. If the data structure is, for example, that of image data, such as that used in facsimile machines or the like, compressed by MMR or MH, the image development processing section 19 performs expansion processing. If the data structure is that of a page description language such as Postscript, the image development processing section 19 performs raster image development processing by developing fonts and by performing pagenation.

Data stored in the main memory 12 is supplied to a display buffer 13 through an image data transfer section 20 or an image data compression and transfer section 21 to be stored in the display buffer 13. Basically, the image data transfer section 20 directly transfers data stored in the main memory 12 to the display buffer 13 while the image data compression and transfer section 21 compresses image data stored in the main memory 12 and supplies the compressed data to the display buffer 13 to store the data.

The image data compression and transfer section 21 performs compression processing as processing of transferring data while thinning out the data at intervals of several lines or processing of reducing the number of lines while performing calculation of logical OR between lines. Alternatively, the image data compression and transfer section 21 counts the number of dots of image data and performs compression processing according to the number of dots.

When each of image data compression and transfer section 21 and the image data transfer section 20 transfers to the display buffer 13 the data read out of the main memory 12, it multivalues the binary image data, thereby enabling fine letters to be displayed without being solidified even on a display having comparatively low resolution. However, the time required for multivaluing resolution conversion processing is long. Therefore, a method such as the one disclosed in Japanese Patent Laid-Open Publication No. 337800/1996 may be used in which a coarse image is first displayed and the data of this image is thereafter replaced successively with multivalued data. If such a method is used, both demands for a high response speed and high image quality can be satisfied.

An area copying processing section 22 executes processing for copying (moving) a part of image data stored in a certain area in the display buffer 13 to another area of the display buffer 13.

A video signal generating section 14 is arranged to read out image data stored in the display buffer 13, to convert the read image data into a video signal, and to output the signal to a display 15 to display a corresponding image.

A keyboard 17 has at least a cursor key 17A and is operated by a user to input various instructions to a CPU 11. A pointing device such as a mouse 16 is operated by a user in such a situation as to designate a predetermined position by using a cursor displayed on the display 15.

Figure 3:
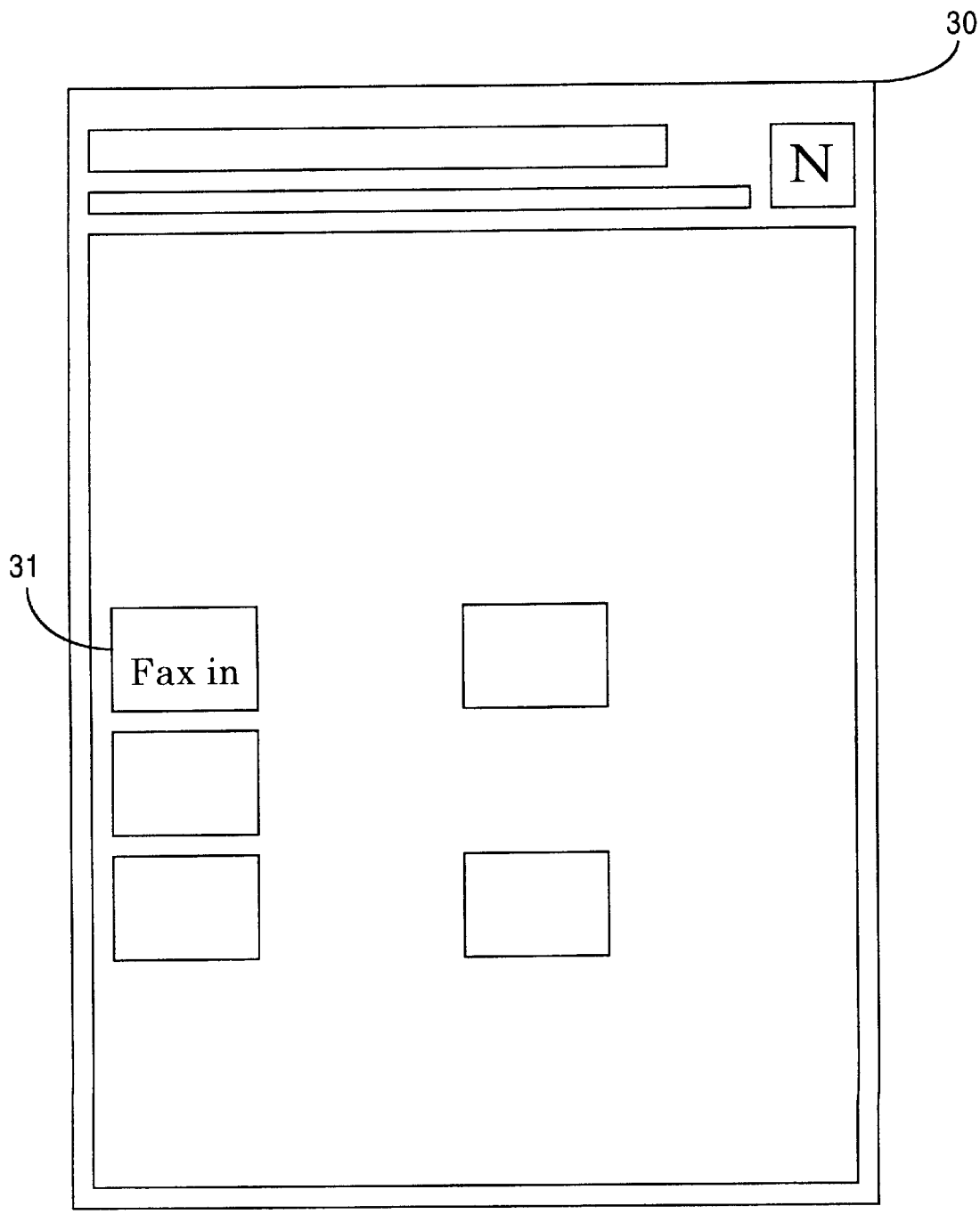
FIG. 3 is a diagram showing an example of a menu display.

The operation of the embodiment shown in FIG. 2 will now be described. First, the keyboard 17 is operated to start, for example, a World Wide Web (WWW) browser such as Netscape Navigator (a trademark of Netscape Communications) in order to access a predetermined homepage on the Internet. Then a Uniform Resource Locator (URL) for designating the predetermined homepage is input. The predetermined homepage is displayed in a window 30 of the WWW browser on the display 15, as shown in FIG. 3, for example. In this homepage, icons 31 and the like for accessing various servers connected to the Internet are displayed.

If in this situation a user operates the pointing device 16 to select, for example, the icon 31 "Fax in", the CPU 11 controls the network interface 23 to gain access to a server connected to the Internet and corresponding to the selected icon. This server is storing image data received from an external terminal through a facsimile receiving circuit or image data (bit-map data) obtained by reading clippings from newspapers, magazines and the like with software such as Hyper Text Makeup Language (HTML) editor, and provides service (Fax in service) for providing the stored data.

The network interface 23 is supplied with data from a server accessed in this manner and supplies the data to the document data storage section 18 to store the data. Part of this data is directly supplied to the image development processing section 19 and undergoes expansion processing or the like in this section to be converted into bit-map data. This converted data is supplied to and stored in the main memory 12.

The data stored in the main memory 12 is supplied and written to the display buffer 13 through the image data transfer section 20. The data written to the display buffer 13 is supplied to the video signal generating section 14 to be converted into a video signal which is supplied to the display 15 to display a corresponding image. In this manner, a homepage of the accessed server, such as that shown in FIG. 4, for example, is first displayed on the display 15.

Figure 4:
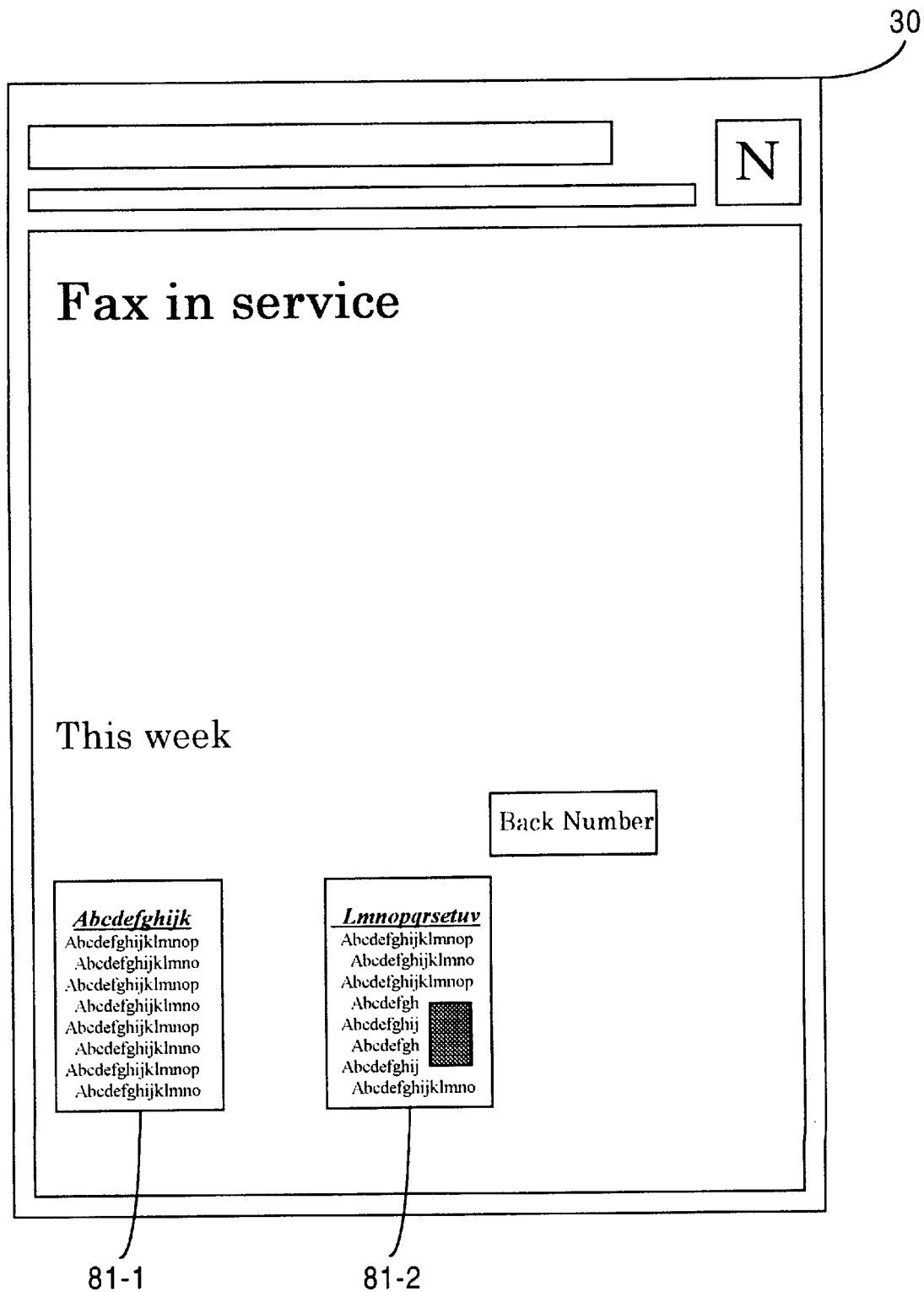
FIG. 4 is a diagram showing an example of a homepage display.

In the example illustrated in FIG. 4, icons 81-1 and 81-2 for designating newspaper clipping files are displayed by being arranged in window 30 of the WWW browser. The icons 81-1 and 81-2 are formed as rough images of newspaper clippings on a reduced scale. The user operates the pointing device 16 or the keyboard 17 by referring to the homepage to select, for example, the icon 81-2 for designating a newspaper clipping file which the user wishes to obtain. If data of the file is not previously stored in the document data storage section 18, the CPU 11 requests the server through the network interface 23 to transmit the corresponding data. The server transmits the data in response to this request. This data is supplied to and stored in the document data storage section 18 through the network interface 23.

Next, the CPU 11 makes the image development processing section 19 read out the file data (document data) stored in the document data storage section 18, convert the data into bit-map data and supply the data to the main memory 12 to store the data. Thereafter, this data is supplied to and stored in the display buffer 13 through the image data transfer section 20 or the image data compression and transfer section 21. Image data reprsenting one frame (page) of image in the date written to the display buffer 13 is supplied to the video signal generating section 14 to be converted into a video signal. The video signal is output to the display 15 to display a corresponding image.

Figure 5:
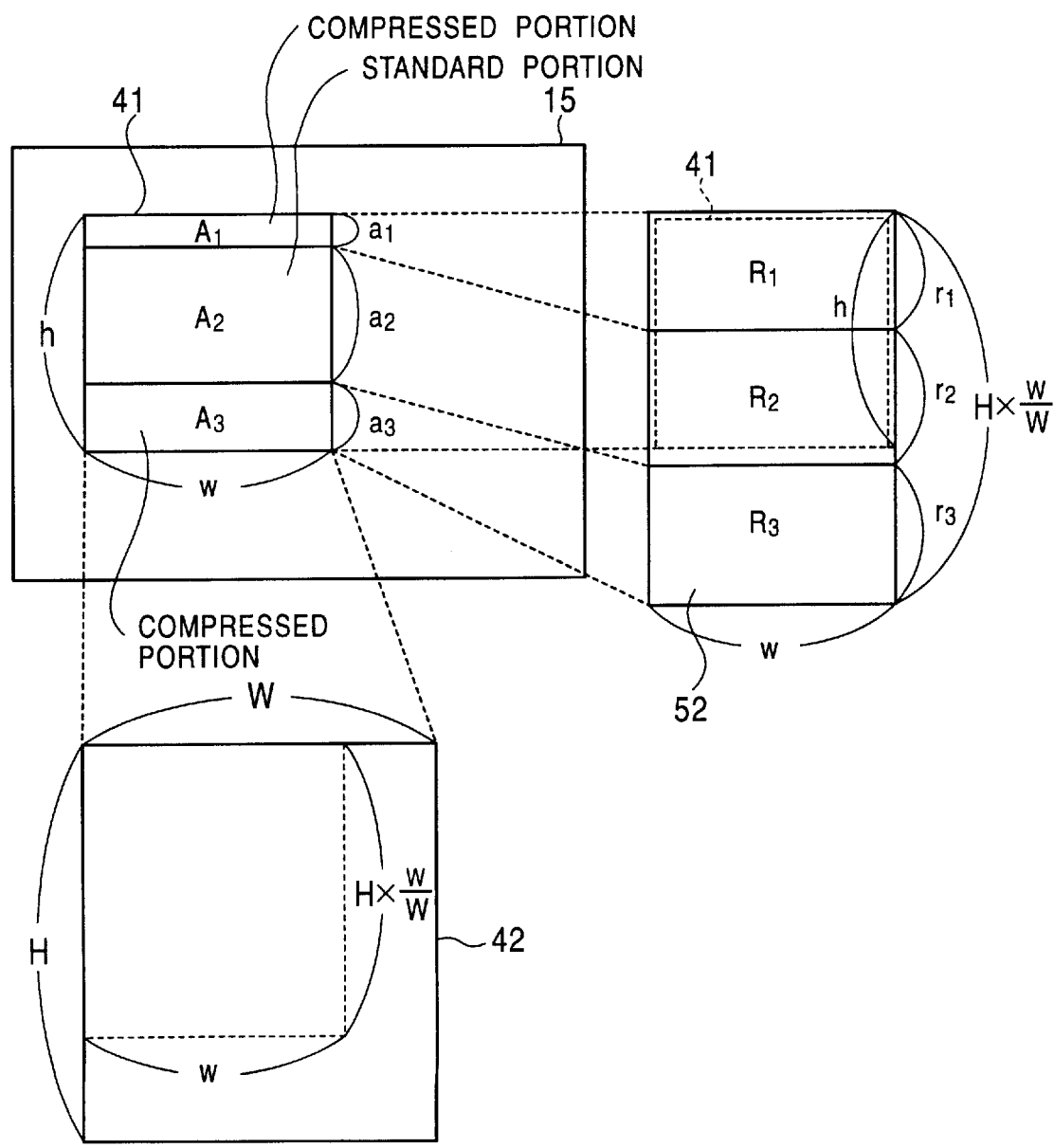
FIG. 5 is a diagram for explaining the principle of display in accordance with the present invention.

The principle of displaying one frame of image will next be described with reference to FIG. 5. It is first assumed that a window 41 is displayed on the display 15, and that one frame (one page) of image of A4 size obtained as a newspaper article clipping and read out from the document data storage section 18 is displayed in the window 41. It is also assumed that one frame of image represented by image data 42 stored in the main memory 12 has a width W and a height H as shown in FIG. 5.

Window 41 has a width w and a height h. The width W defined by image data 42 is larger than the width w of window 41 and the height H defined by image data 42 is also larger than the height h of window 41. In this case, the entire image of image data 42 cannot be directly displayed in window 41. In this embodiment, therefore, processing for setting (adjusting) the width W of image data 42 to the width w of window 41 is performed. That is, image data 42 is compressed at a compression ratio of w/W in total in the directions of width and height.

Image data 52 obtained by compressing image data 42 in the directions of width and height at w/W in total is further compressed in the direction of height, as described below, if the height h of window 41 is smaller than the height H×(w/W) of image data 52. Window 41 is divided into an area $A_2$ having a height a2 which is, for example, 70% of the height h of window 41, an area $A_1$ located above the area $A_2$ and having a height $a_1$, and an area $A_3$ located below the area $A_2$ and having a height $a_3$. Correspondingly, image data 52 is divided with respect to storage areas: an area $R_2$ having a height $r_2$ (=$a_2$); an area $R_1$ located above the area $R_2$ and having a height $r_1$; and an area $R_3$ located below the area $R_2$ and having a height $r_3$.

The data in area $R_2$ for image data 52 is transferred to and displayed in area $A_2$ of window 41 directly (without being compressed). On the other hand, the data in area $R_1$ is transferred to and displayed in area $A_1$ by being compressed in the vertical direction and the data in area $R_3$ is transferred to and displayed in area $A_3$ by being compressed in the vertical direction. Since area $A_2$ having a height $a_2$ set to 70% of the height h of window 41 is provided and since the height $r_2$ of area $R_2$ for image data 52 is set to the same value as $a_2$, the resulting image has in area $A_2$ a standard portion in which letters are displayed in the correct ratio (with respect to the dimensions in vertical and horizontal directions). However, the resulting image has, in areas $A_1$ and $A_3$, compressed portions in which letters are displayed by being compressed in the vertical direction. Area $A_2$ for such a standard image portion and each of areas $A_1$ and $A_3$ for such compressed image portions in window 41 (and the corresponding storage areas in display buffer 13) will hereinafter be referred to as "standard-display area" and "compressed-display area", respectively, as occasion demands.

Figure 6:
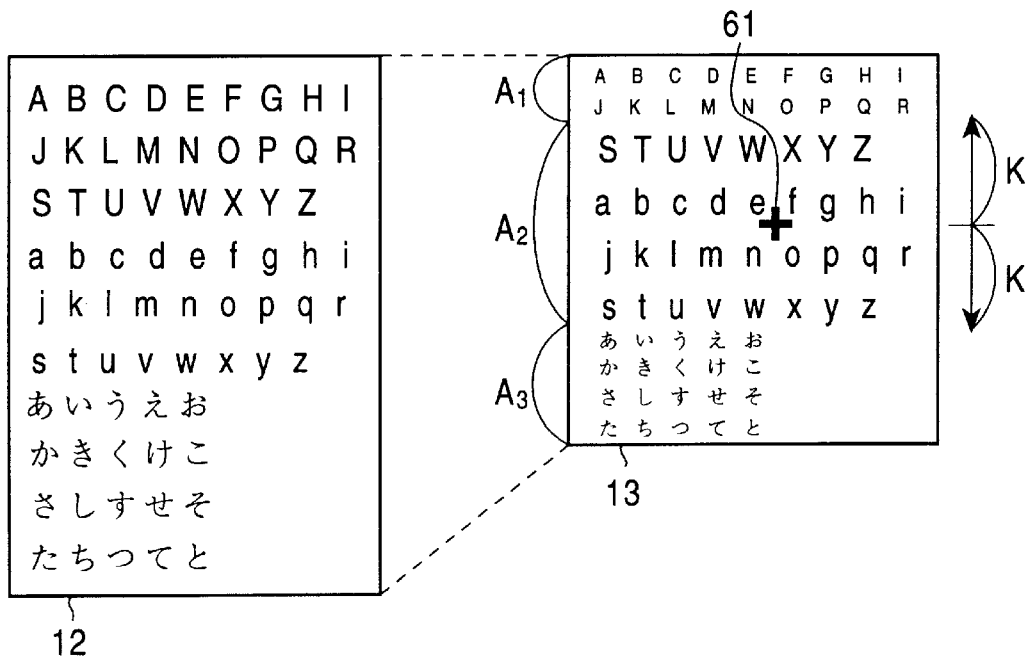
FIG. 6 is a diagram of the relationship between a cursor and a display area.
Figure 7:
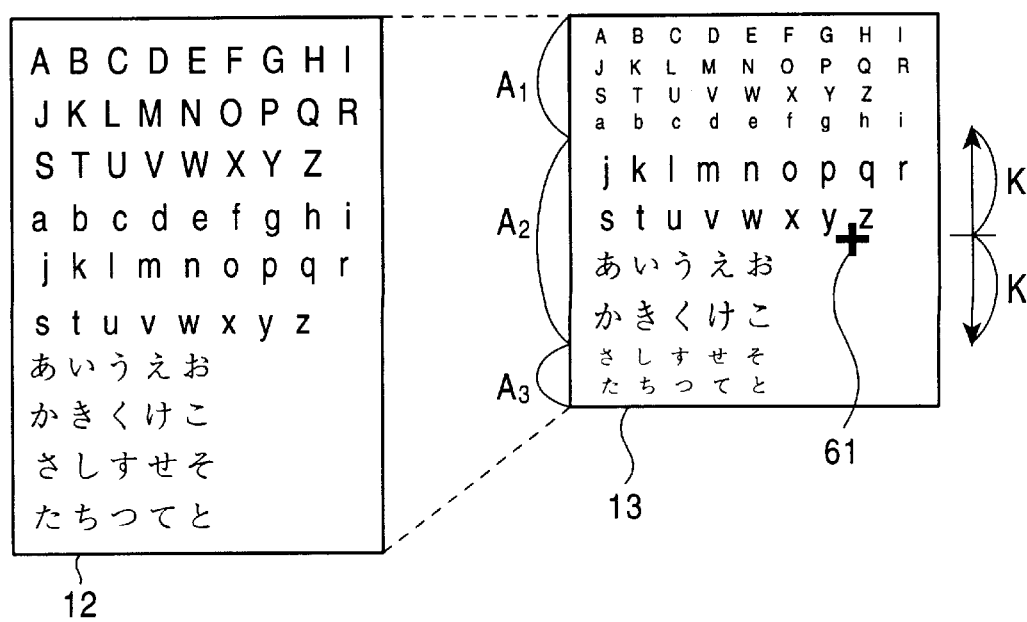
FIG. 7 is a diagram for explaining the principle of display in accordance with the present invention when the cursor is moved.

The position of standard-display area $A_2$ can be changed by using a cursor. FIGS. 6 and 7 show the relationship between the areas before and after changing the position of area $A_2$. As shown in FIG. 6, an area of the display buffer 13 (and a corresponding area in window 41) to an extent of K above a center corresponding to the position of cursor 61 and to an extent of K below the center is set as standard-display area $A_2$, and areas above and below area $A_2$ are set as areas $A_1$ and $A_3$. If the cursor 61 is moved downward from the state shown in FIG. 6, standard-display area $A_2$ is shifted downward from the position shown in FIG. 6 to the position shown in FIG. 7. Simultaneously, area $A_1$ is increased from the state shown in FIG. 6 to the state shown in FIG. 7 while area $A_3$ is reduced from the state shown in FIG. 6 to the state shown in FIG. 7.

Processing for executing display on the basis of the above-described principle will next be described in detail with reference to the flowchart of FIG. 8. First, in step S1, processing for adjusting the length of an image in the horizontal direction to the length of the window in the same direction is executed. That is, as described above with reference to FIG. 5, processing for converting the width W of one frame of image stored in the main memory 12 into a width equal to the width w of window 41 is executed. Actually, this processing is performed by the image development processing section 19. That is, the image development processing section 19 compresses bit-map data read out from the document data storage section 18 in the vertical and horizontal directions at w/W and writes the compressed data to the main memory 12.

Next, in step S2, the CPU 11 compares the height pageh of one frame of image data (image data 52) stored in the main memory 12 with the height dh of the area of the display buffer 13 (the height of window 41).

Figure 8:
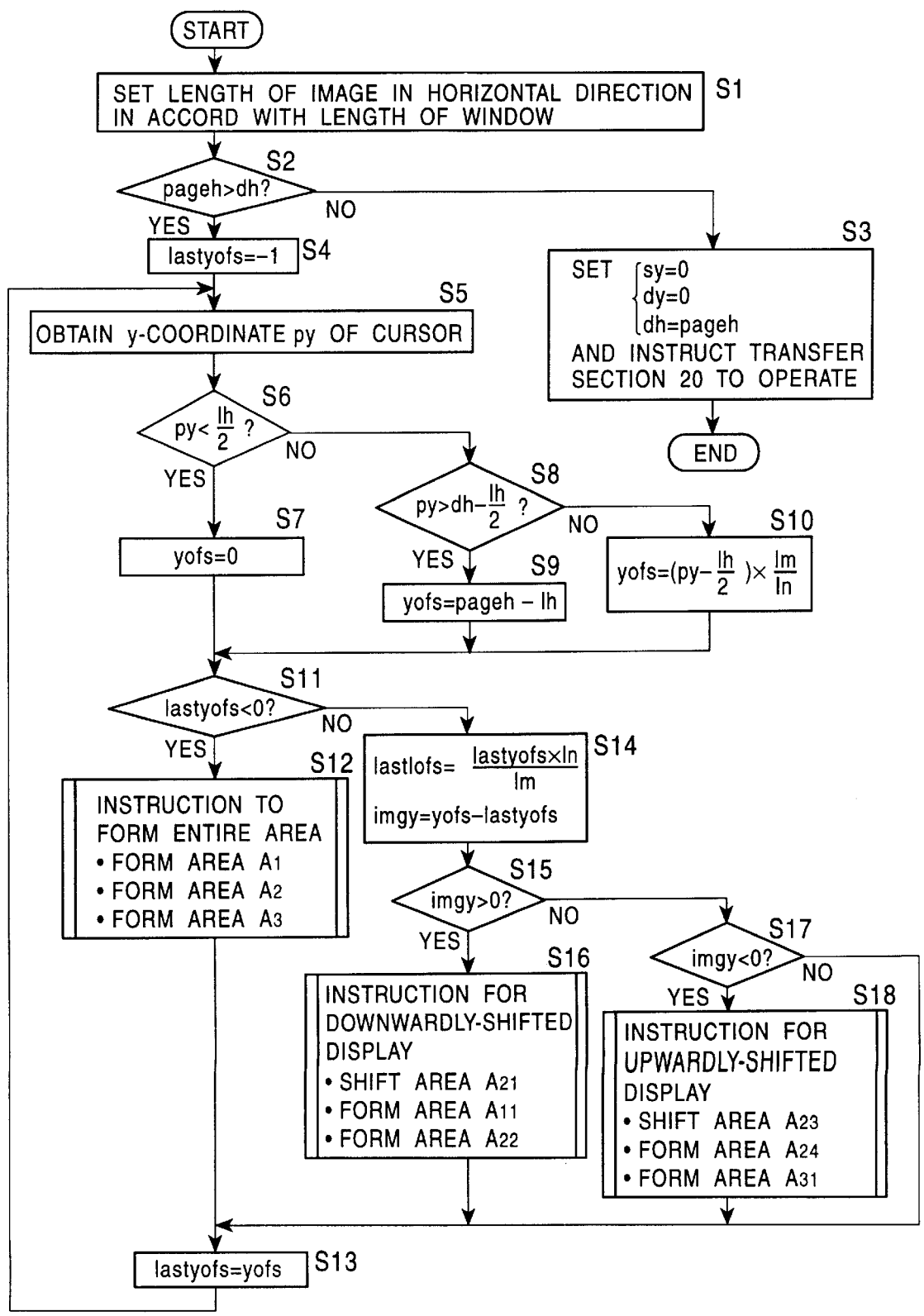
FIG. 8 is a flowchart of the operation of the embodiment shown in FIG. 1.
Figure 9:
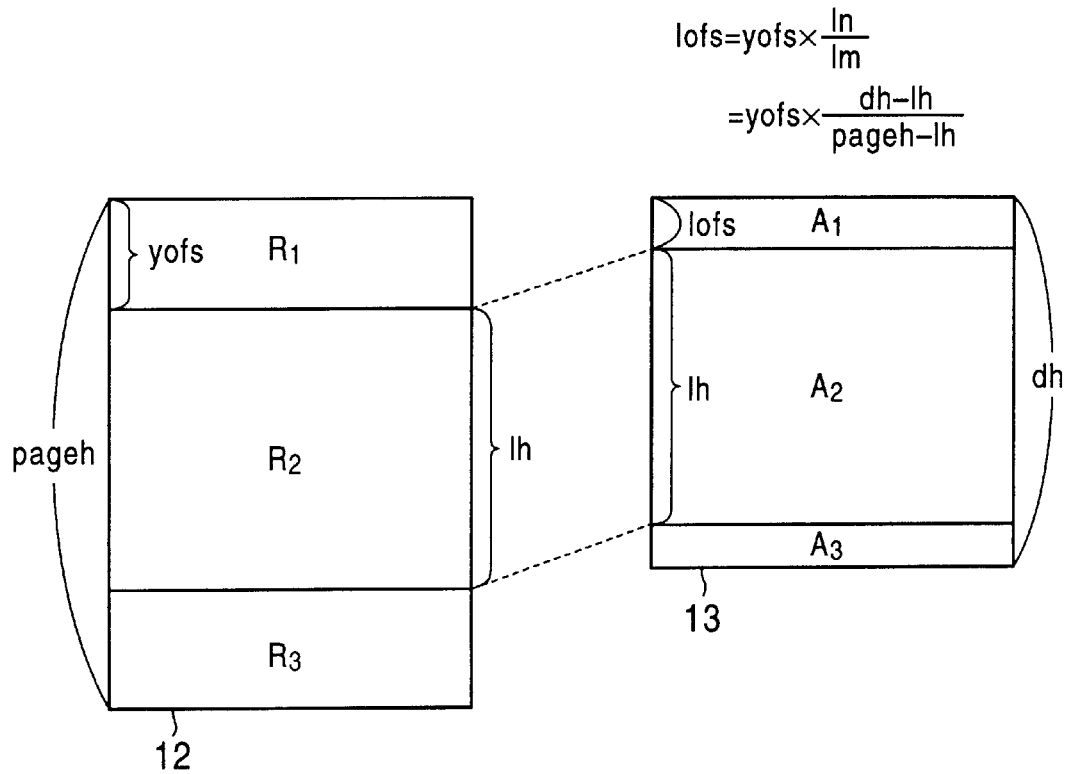
FIG. 9 is a diagrams of variables in the processing shown in FIG. 8.

That is, the sizes of the image data in the main memory 12 and the image data in the display buffer 13, which must be known in executing the processing shown in FIG. 8, are expressed as shown in FIG. 9; the height of the bit map data in the main memory 12 is pageh (the height H×(w/W) of image data 52 shown in FIG. 5), the height of upper compressed-display area $R_1$ is yofs ($r_1$ in FIG. 5), and the height of standard-display area $R_2$ is lh (($r_2$ (=$a_2$)) in FIG. 5).

Also, the height of the area of the display buffer 13 is dh (the height h of window 41 shown in FIG. 5) and the height of an upper compressed-display area $A_1$ is lofs ($a_1$ in FIG. 5). The height of area $A_2$ is also lh in the display buffer 13.

If the sum of the heights of areas $R_1$ and $R_3$ defined as compression object areas is lm (=pageh−lh) and if the sum of the heights of areas $A_1$ and $A_3$ defined as compressed display areas is ln (=dh−lh), the height of area $A_1$ is set by the following equation to equalize the compression ratios of areas $R_1$ and $R_3$:

$$lofs = yofs \times (ln / lm)$$
$$= yofs \times (dh - lh) / pageh - lh).$$

That is, the ratio of compression in the direction of height is ln/lm.

Referring back to FIG. 8, if it is determined in step S2 that the pageh is equal to or smaller than dh, that is, the height pageh of one frame of image data stored in the main memory 12 is equal to or smaller than the height dh of window 41, the entire frame of data can be directly displayed on window 41 without being compressed in the direction of height.

In this case, the process moves to step S3 to set, in the image data transfer section 20, 0 as a y-coordinate sy of data to be read out from the main memory 12, pageh as a read-out range (height) sh, and 0 as a y-coordinate dy of a transfer destination in the display buffer 13 of data read out from the main memory 12.

Figure 10:
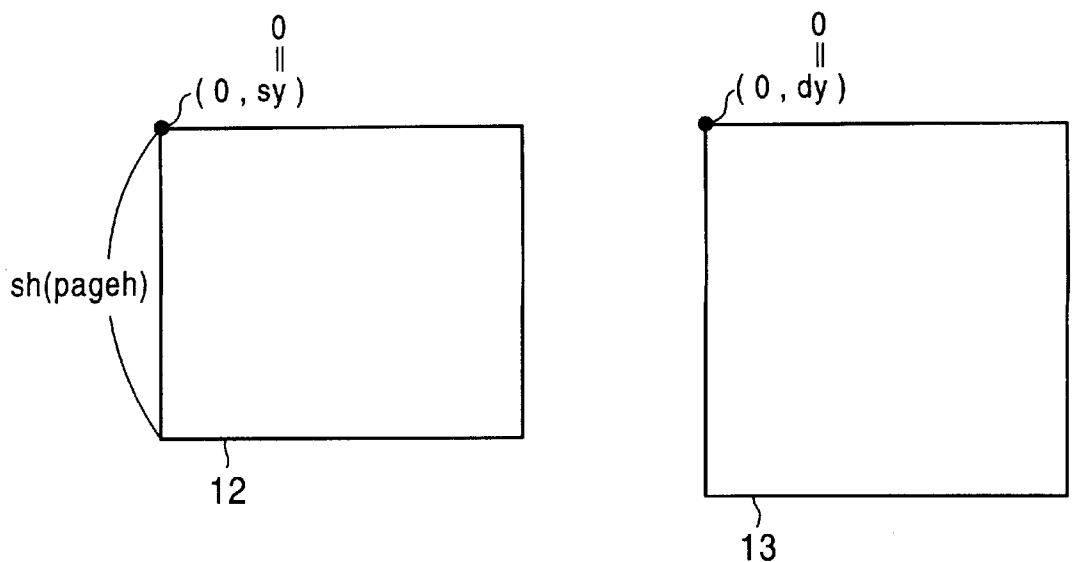
FIG. 10 is a diagram for explaining processing of step S3 shown in FIG. 8.

FIG. 10 shows the result of the above-described setting. A point (0, sy) is designated as a read start point in the main memory 12, and pageh is designated as a read-out range sh. Also, a point (0, dy) is designated as a write start point of a transfer destination address in the display buffer 13 to which the data read out from the main memory 12 is transferred. Accordingly, the image data transfer section 20 reads out the data in the area from the start point (0, sy) to pageh in the main memory 12 and writes the data successively from the start point (0, dy) in the display buffer 13. All the data of one frame of image stored in the main memory 12 is thereby written in such a standard state that the ratios of compression in the vertical and horizontal directions are equal to each other. Thus, the entire data of one frame of image is regularly displayed in the window 41 on the display 15.

On the other hand, if it is determined in step S2 that pageh is larger than dh, that is, the height pageh of one frame of image is larger than the height dh of window 41, the entire frame of image cannot be regularly displayed in window 41. In this case, the process moves to step S4 to initialize a variable lastyofs to −1. This variable lastyofs represents yofs (FIG. 9) of a preceding frame of image. Initialization to −1 in step S4 is made to indicate that there is no preceding image. Determination as to whether the present image follows no preceding image is made in step S11 described below. If the present image follows no preceding image, processing of step S12 is executed. The process then advances to step S13 to set yofs (zero or positive) as lastyofs for discrimination of the present image from the following image.

Next, the process advances to step S5 to read the y-coordinate of cursor 61 on window 41 (display buffer 13). The read value is set as py. The coordinate system is such that the origin is set at the upper left corner point of window 41 and the x- and y-axes extend from this point horizontally rightward and vertically downward, respectively.

Figure 11:
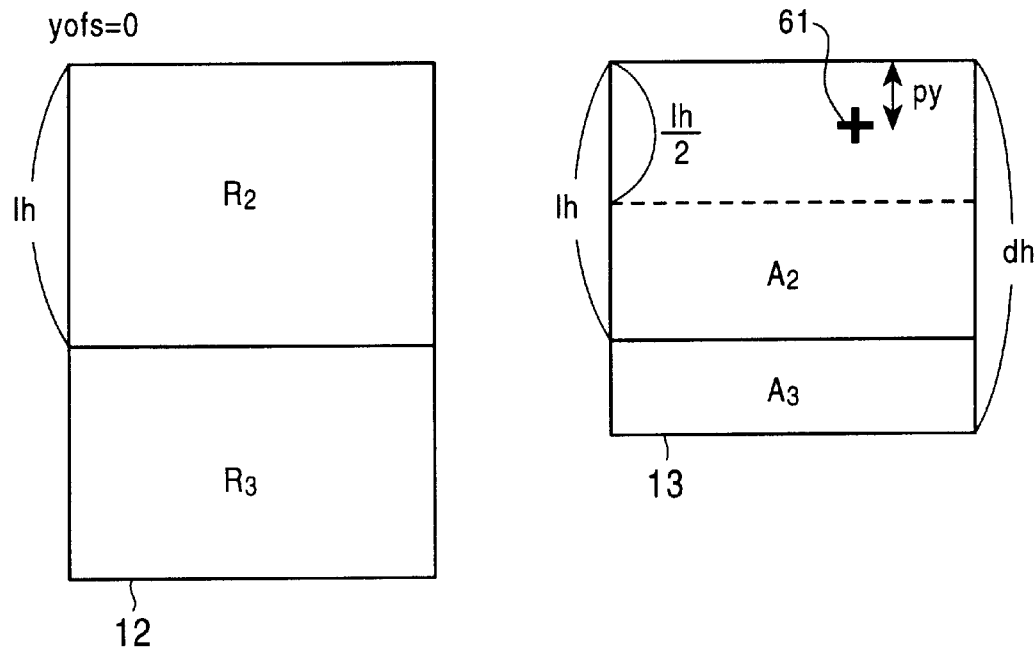
FIG. 11 is a diagram for explaining processing of step S7 shown in FIG. 8.

In step S6, determination is made as to whether the y-coordinate py of cursor 61 is smaller than lh/2 which is ½ of the height of standard-display area $A_2$. As shown in FIG. 11, if the y-coordinate py of cursor 61 is smaller than lh/2, the displayed position of standard-display area $A_2$ cannot be further shifted upward. In this case, therefore, yofs with which the y-coordinate of standard-display area $R_2$ in the main memory 12 is prescribed is set to 0 in step S7. Consequently, in this case, no upper compressed-display area $A_1$ is defined above standard-display area $A_2$ in window 41; only standard-display area $A_2$ and lower compressed-display area $A_3$ are defined.

Figure 12:
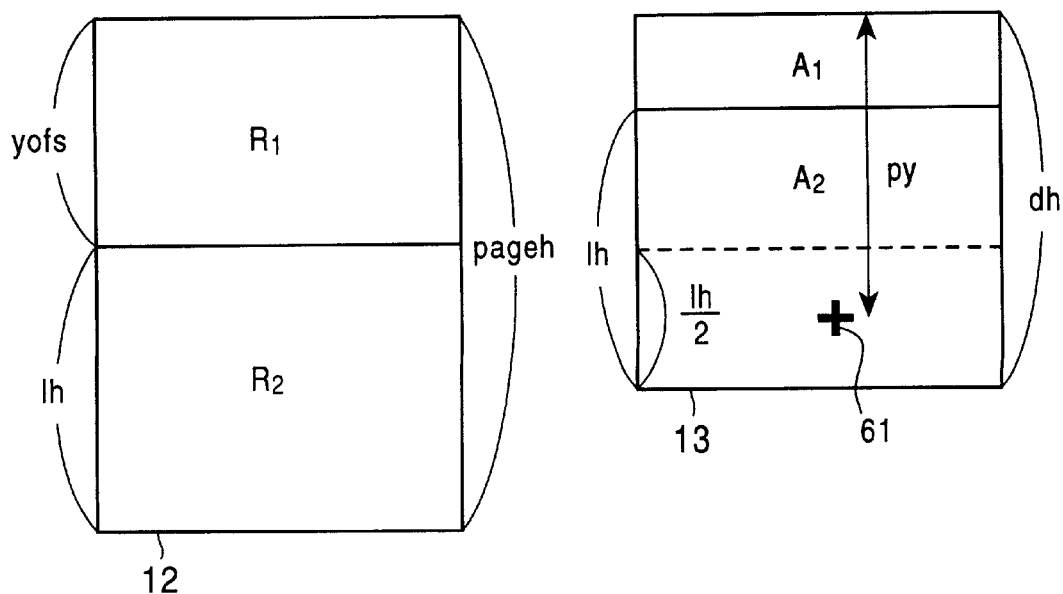
FIG. 12 is a diagram for explaining processing of step S9 shown in FIG. 8.

If it is determined in step S6 that the y-coordinate py of cursor 61 is equal to or larger than lh/2, the process moves to step S8 and determination is made as to whether the coordinate py is larger than dh−lh/2. As shown in FIG. 12, if the position of the y-coordinate py of cursor 61 is below the position at the distance of lh/2 from the lower end of window 41, standard-display area $A_2$ cannot be further shifted downward in window 41. In this case, the process advances to step S9 to set pageh−lh as yofs representing the y-coordinate of the start point of standard-display area $R_2$ in the main memory 12.

Figure 13:
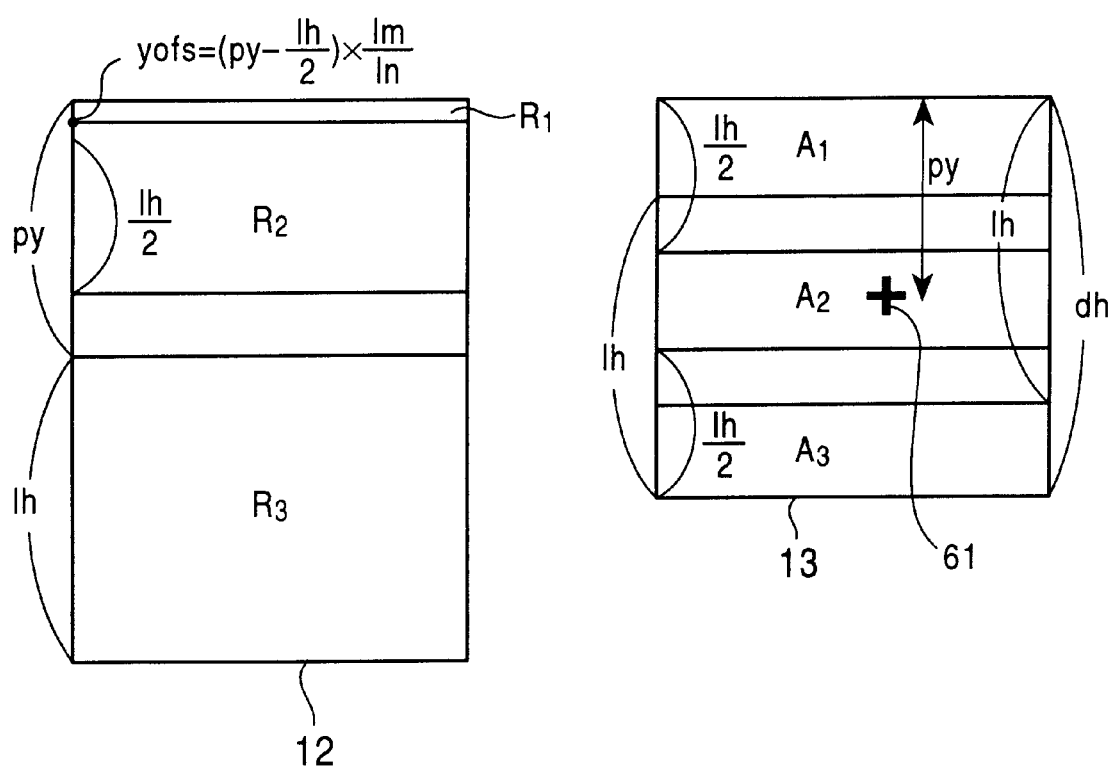
FIG. 13 is a diagram for explaining processing of step S10 shown in FIG. 8.

If it is determined in step S8 that the coordinate py is equal to or smaller than dh−lh/2, standard-display area $A_2$ can be further shifted upward or downward, as shown in FIG. 13. In this case, compressed-display area $A_1$ is formed above standard-display area $A_2$, and compressed-display area $A_3$ can also be formed below area $A_2$. Then, the process moves to step S10 and the coordinate yofs corresponding to the top value of the y-coordinate of standard-display area $R_2$ in the main memory 12 is set to a value expressed by the following equation:

$$yofs=(py-lh/2)\times(lm/ln).$$

After the processing of step S7, S9 or S10, the process advances to step S11 and determination is made as to whether lastyofs is smaller than 0, i.e., negative. If an image is displayed in window 41 for the first time, −1 is set as lastyofs in step S4, as described above. In this case, the process advances to step S12 to execute processing for forming all the areas $A_1$, $A_2$, and $A_3$ in window 41.

Figure 14:
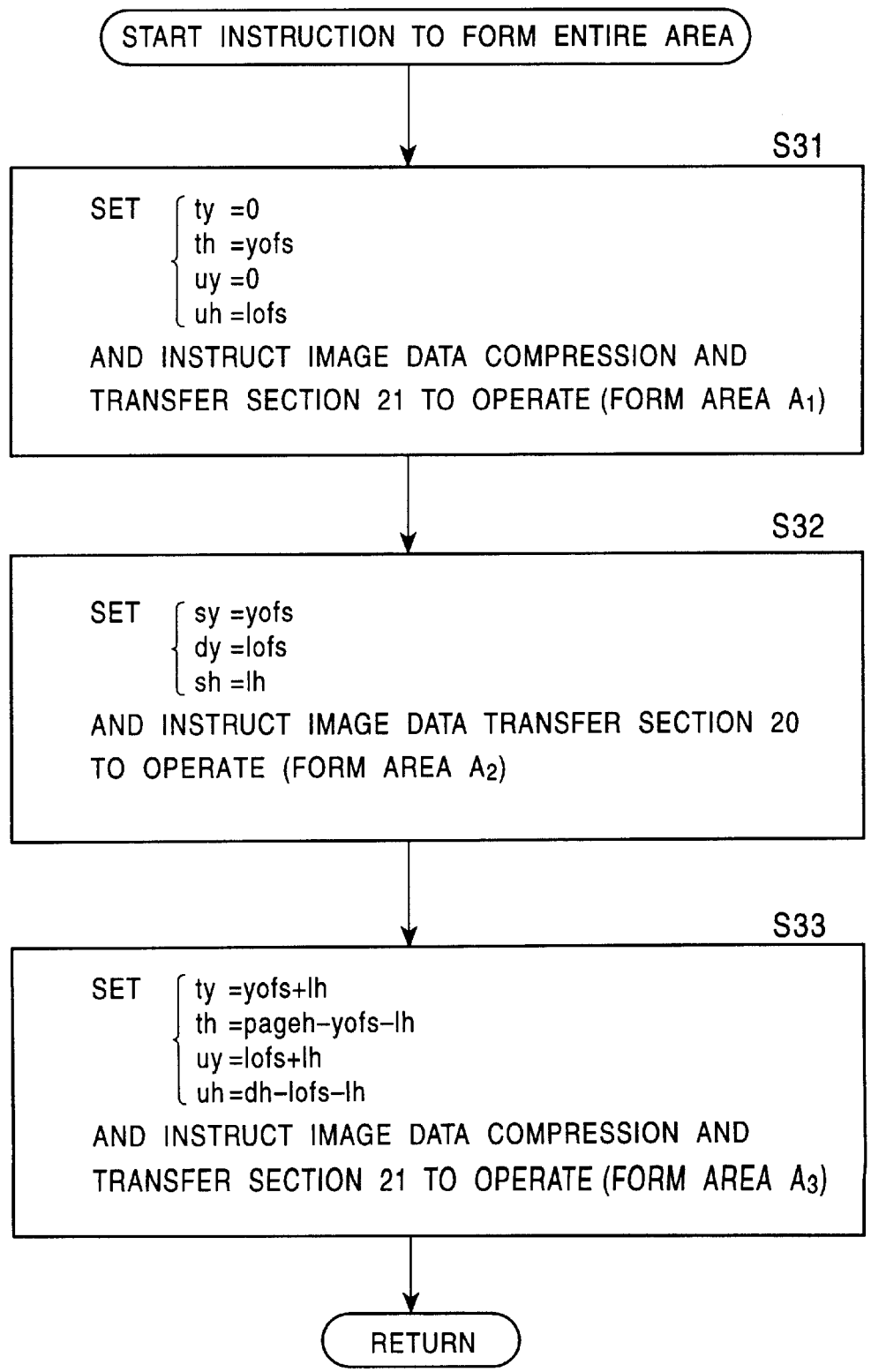
FIG. 14 is a flowchart showing details of processing of step S12 shown in FIG. 8.
Figure 15:
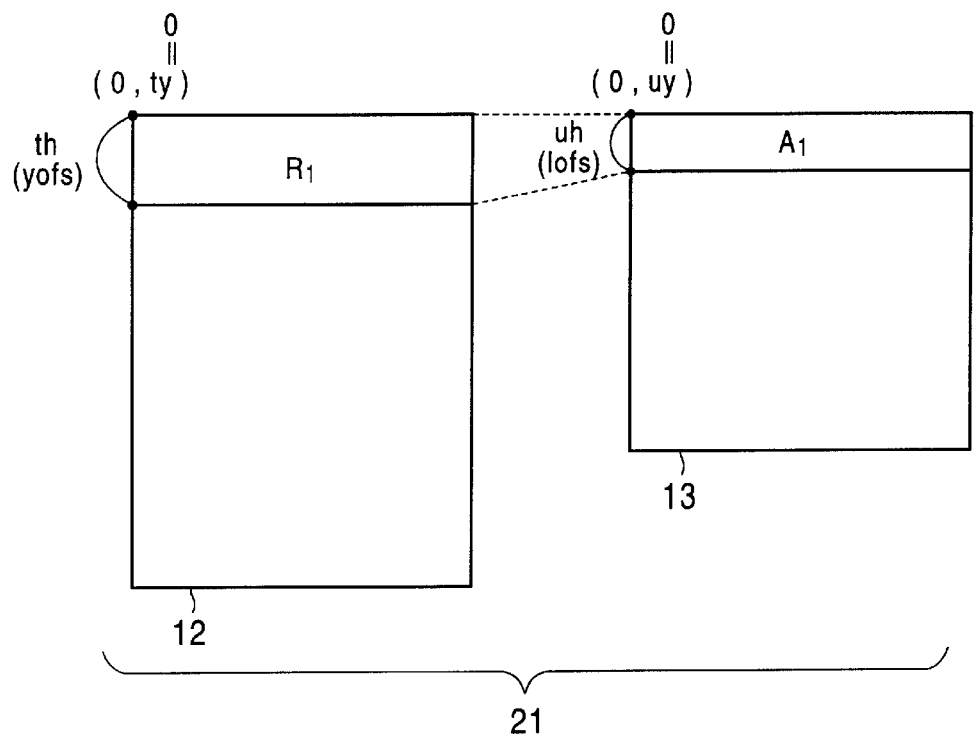
FIG. 15 is a diagram for explaining processing of step S31 shown in FIG. 14.

The flowchart of FIG. 14 shows details of the entire area formation instruction processing of step S12. First, in step S31, 0 is set as a y-coordinate ty of a read-source address in the main memory 12 in the image data compression and transfer section 21 and yofs is also set as a read-out range (height) th in this section, as shown in FIG. 15. This yofs is set in one of steps S7, S9, and S10, as mentioned above.

Also, 0 is set as a y-coordinate uy of a first transfer-destination address in the display buffer 13 (window 41), and lofs is set as a transfer-destination range (height) uh. As mentioned above, this lofs is calculated by the following equation:

$$lofs=yofs\times(dh-lh)/(pageh-lh).$$

After this setting, the image data compression and transfer section 21 is instructed to operate. That is, as shown in FIG. 15, the image data compression and transfer section 21 reads out data in area $R_1$ in the range th from the y-coordinate ty (=0) in the main memory 12, and transfers and writes (displays) this data to area $A_1$ in the range uh from y-coordinate uy (=0) in the display buffer 13 (window 41) by compressing the data in the vertical direction.

Figure 16:
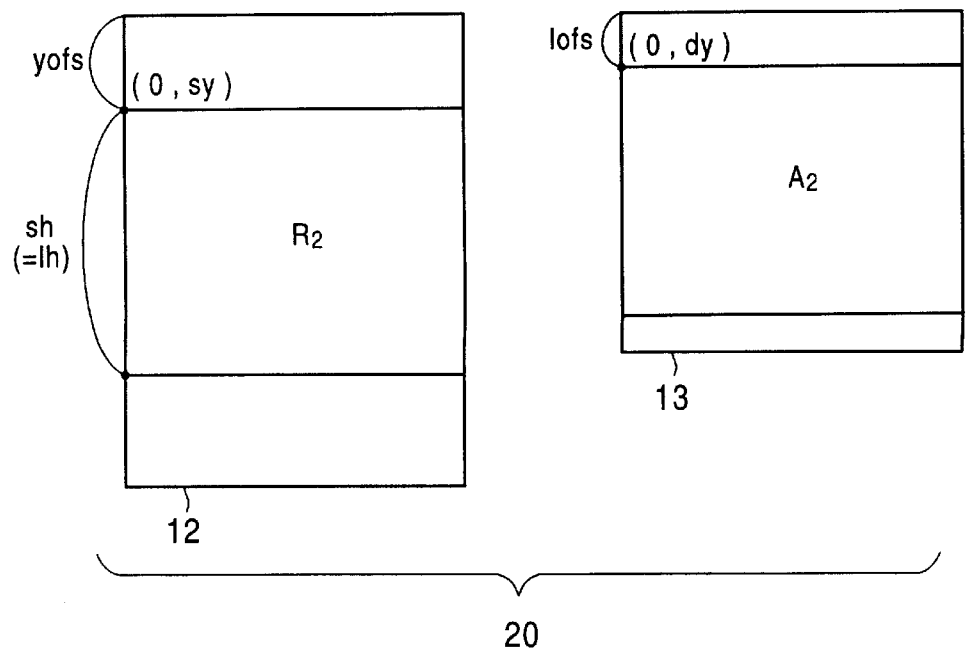
FIG. 16 is a diagram for explaining processing of step S32 shown in FIG. 14.

Next, in step S32, as shown in FIG. 16, yofs is set as a read-source y-coordinate sy in the main memory 12 from which the image data transfer section 20 reads out data, and lh is set as a read-out range (height) sh. Also, lofs is set as a read-destination y-coordinate dy in the display buffer 13. The image data transfer section 20 is then instructed to operate. Data in area $R_2$ in the range lh from y-coordinate yofs in the main memory 12 is thereby transferred directly to area $A_2$ of the display buffer 13 (without being compressed).

Figure 17:
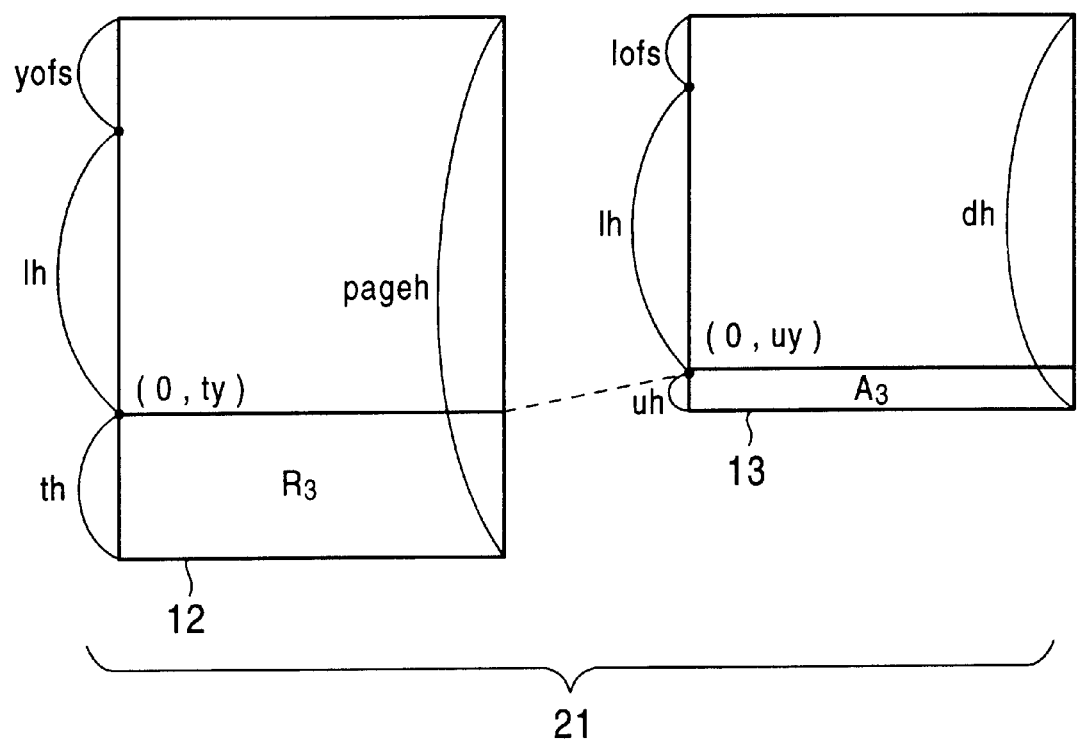
FIG. 17 is a diagram for explaining processing of step S33 shown in FIG. 14.

Next, in step S33, as shown in FIG. 17, yofs+lh is set as a read-source y-coordinate ty in the main memory 12 from, and pageh−yofs−lh is set as a read-out range (height) th. Also, lofs+lh is set as a read-destination y-coordinate uy in the display buffer 13, and dh−lofs−lh is set as a read-out-destination range (height) uh. The image data compression and transfer section 21 is then instructed to operate. Data in area $R_3$ in the range th from y-coordinate ty in the main memory 12 is thereby transferred to and stored in the range uh from y-coordinate uy in the display buffer 13 as area $A_3$ data.

In the above-described manner, image portions having areas $A_1$, $A_2$, and $A_3$ are written in the display buffer 13 to be displayed in window 41 of the display 15.

Referring back to FIG. 8, the process advances to step S13 to set the value of the present yofs as a variable lastyofs representing the preceding yofs. The process then returns to step S5 to repeat the subsequent processing.

Once yofs is set as lastyofs, a determination result NO is obtained in step S11 since yofs is 0 or a positive integer. The process then moves to step S14, in which a variable lastlofs representing the y-coordinate of the preceding standard-display area $A_2$ in window 41 is calculated by the following equation:

$$lastlofs=lastyofs\times(ln/lm).$$

That is, lastlofs is obtained by multiplying lastyofs by compression ratio ln/lm.

Further, a variable imgy is calculated by the following equation:

$$imgy=yofs-lastyofs.$$

That is, this variable imgy represents the difference between the present yofs and the lastyofs as the preceding yofs.

Figure 18:
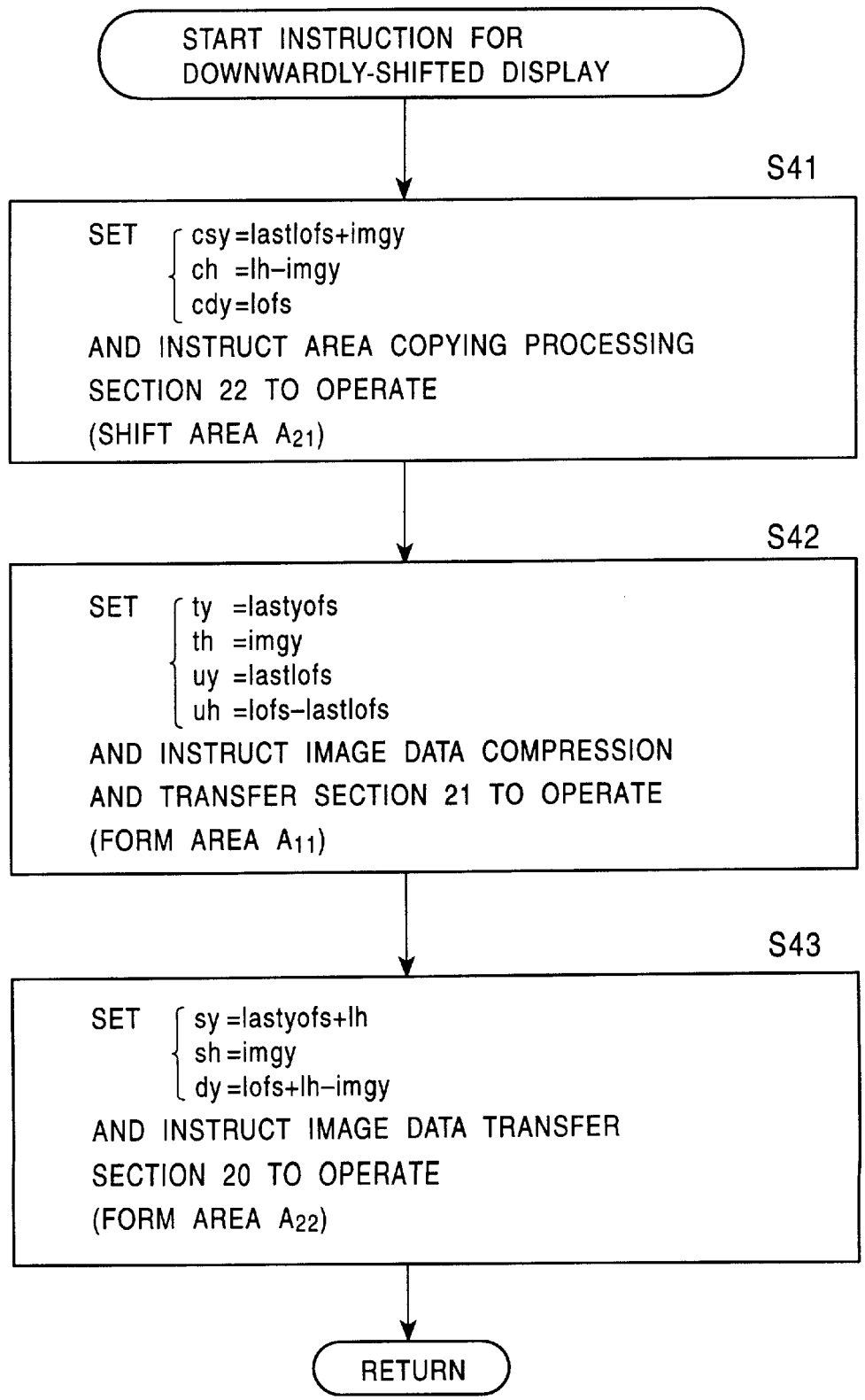
FIG. 18 is a flowchart showing details of processing of step S16 shown in FIG. 8.

Next, in step S15, determination is made as to whether imgy calculated in step S14 is larger than 0. Since imgy is the difference between the present yofs and the lastyofs as the preceding yofs, a positive value of imgy indicates that the present yofs is larger than the lastyofs as the preceding yofs, that is, there is a need to downwardly shift the displayed position of standard-display area $A_2$. In this case, the process advances to step S16 to execute downwardly-shifted display instruction processing. The flowchart of FIG. 18 shows details of this processing.

Figure 19:
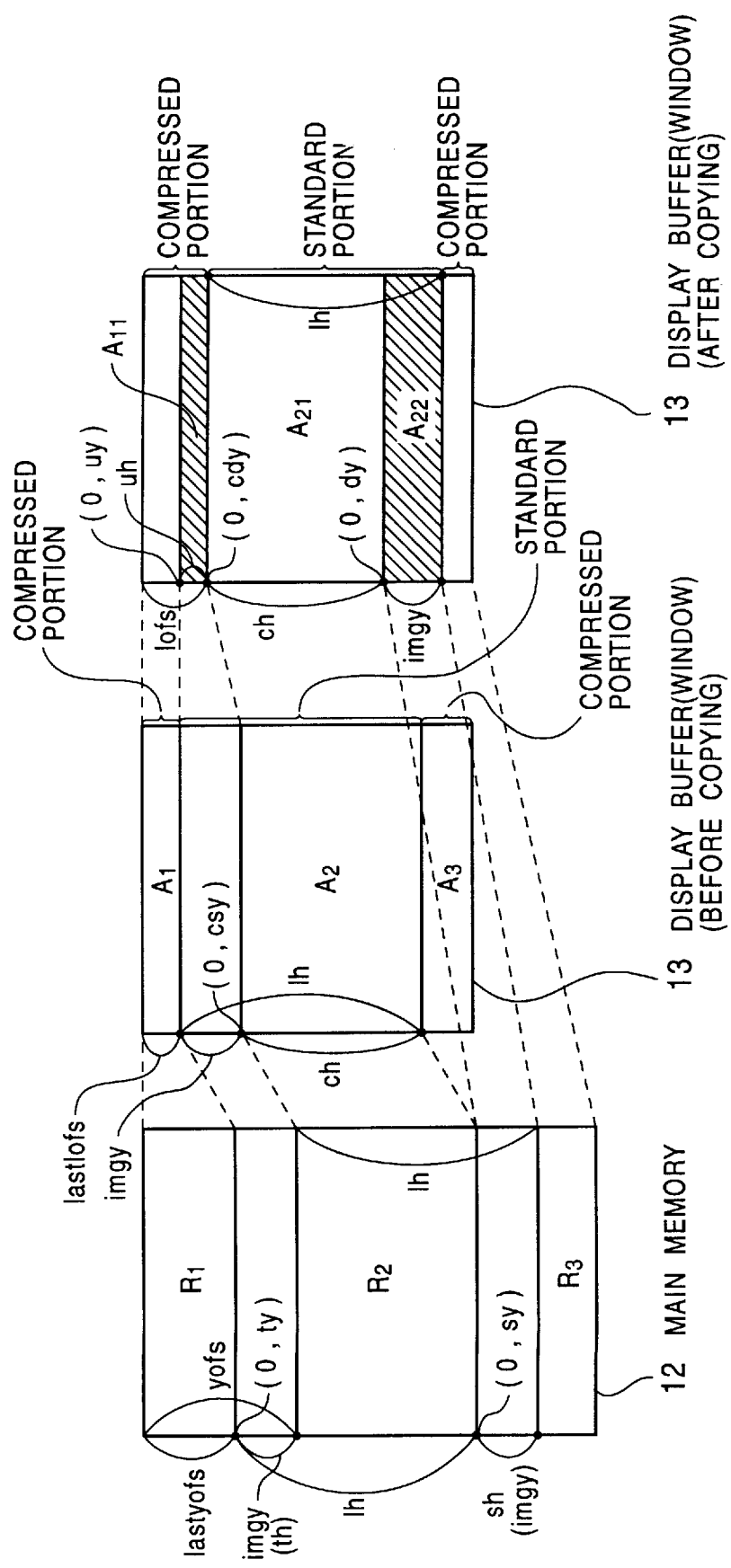
FIG. 19 is a diagram for explaining processing shown in FIG. 18.

First, in step S41 of this processing, lastlofs+imgy is set as a copy-source y-coordinate csy in the area copying processing section 22, as shown in FIG. 19. That is, a position lowered by imgy from the top of the preceding standard-display area $A_2$ in window 41 is set. Also, lh−imgy is set as a read-out range (height) ch. That is, a range determined by subtracting imgy from the entire range of the preceding standard-display area $A_2$ is set as ch. Further, lofs is set as a copy-destination y-coordinate cdy.

The area copying processing section 22 is then instructed to operate. In the display buffer 13, data written in the range ch from csy in standard-display area $A_2$ is thereby moved and copied directly into the area in the range ch from cdy.

Next, in step S42, lastyofs in the main memory 12 is set as transfer-source coordinate ty from which the image data compression and transfer section 21 transfers data. That is, the top coordinate of area $R_2$ of the preceding image is set. Also, imgy is set as a transfer range (height) th. That is, the range imgy from the top coordinate lastyofs of the preceding standard-display area $R_2$ to the top coordinate yofs of the standard-display area $R_2$ formed this time is set as a transfer range.

Also, the top y-coordinate lastlofs of the preceding standard-display area $A_2$ in the display buffer 13 is set as a transfer-destination coordinate uy, and lofs−lastlofs is set as a transfer range (height) uh. That is, the upper compressed-display area formed this time has the range lofs, but compressed data has already been set in the range lastlofs in the preceding buffer 13 area, which range is included in the range lofs. With respect to this upper compressed-display area, therefore, image data may be newly stored only in the range uh from lastlofs to lofs (area $A_{11}$ indicated by hatching in FIG. 19) by being compressed.

After the completion of the above-described setting, the image data compression and transfer section 21 is instructed to operate. Image data in the range from lastyofs to imgy in the main memory 12 is thereby transferred to the area in the range uh from lastlofs to lofs in the display buffer 13 while being compressed in the vertical direction, thereby completing an image in area All.

The process further advances to step S43 to set lastyofs+lh as a transfer-source coordinate sy from which the image data transfer section 20 transfers data. That is, the final coordinate of the preceding standard-display area $R_2$ is set as a top transfer-source coordinate. Also, imgy is set as a transfer-source range sh. Further, lofs+lh−imgy is set as a transfer-destination coordinate dy.

The image data transfer section 20 is thereafter instructed to operate. Data in the range from lastyofs+lh to imgy in the main memory 12 is thereby transferred and written directly to the area in the range imgy from lofs+lh−imgy in the display buffer 13, as shown in FIG. 19. Thus, an image is completed in area $A_{22}$ indicated by hatching in FIG. 19.

Thus, the new standard-display area is formed of the area $A_{21}$ formed by directly copying part of the data in the preceding standard-display area, and the area $A_{22}$ newly formed. To form the compressed image portion below the standard portion formed this time, part of the image data in the area $A_3$ of the preceding compressed portion is used by being directly transferred.

As described above, when a new image is displayed, image data which has already been written to the display buffer 13 and which is immediately usable for the new image by being transferred is used instead of the corresponding data read out from the main memory 12 and processed while only image data which needs to be newly processed is read out from the main memory 12 and processed. In this manner, a displayed image can be updated at a high speed. Also, the standard portion image data is first moved and copied, so that an image seen by a user can be displayed most speedily.

As described above, when cursor 61 is moved downward by operating pointing device 16 or cursor keys 17A on keyboard 17, a lower portion of one frame of image data can be displayed in the correct ratio. In this case, the upper compressed image area is increased while the lower compressed image area is reduced.

Referring back to FIG. 8, after executing the downwardly-shifted display instruction processing of step S16, the process moves to step S13 to set yofs as lastyofs. The process then returns to step S5 to execute the subsequent processing.

Figure 20:
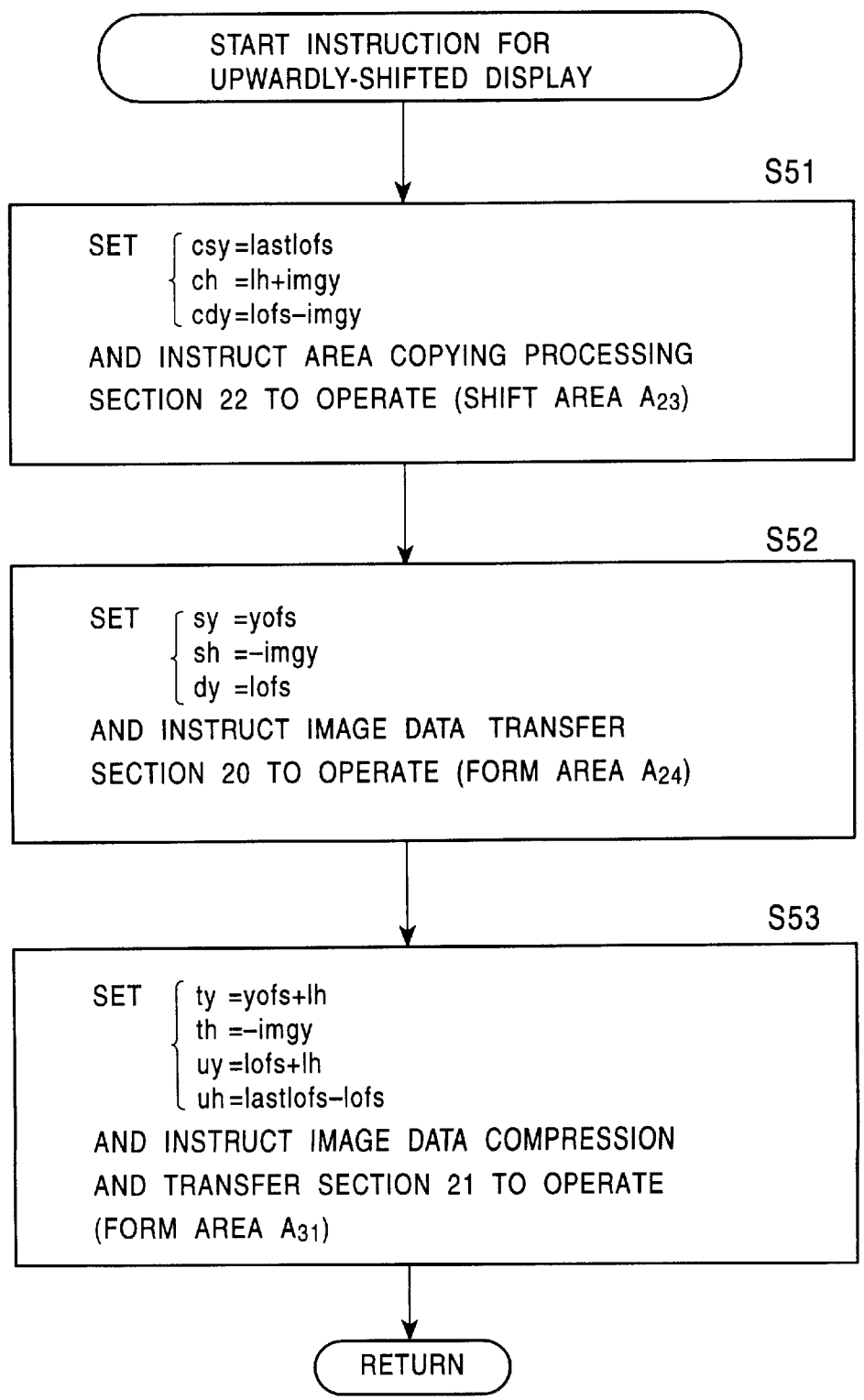
FIG. 20 is a flowchart showing details of processing of step S18 shown in FIG. 8.

If it is determined in step S15 that imgy is not positive, the process moves to step S17 and determination is made as to whether imgy is negative. If imgy is negative, that is, the cursor 61 is moved upward from the present position, the process advances to step S18 to execute upwardly-shifted display instruction processing. The flowchart of FIG. 20 shows details of this upwardly-shifted display instruction processing.

Figure 21:
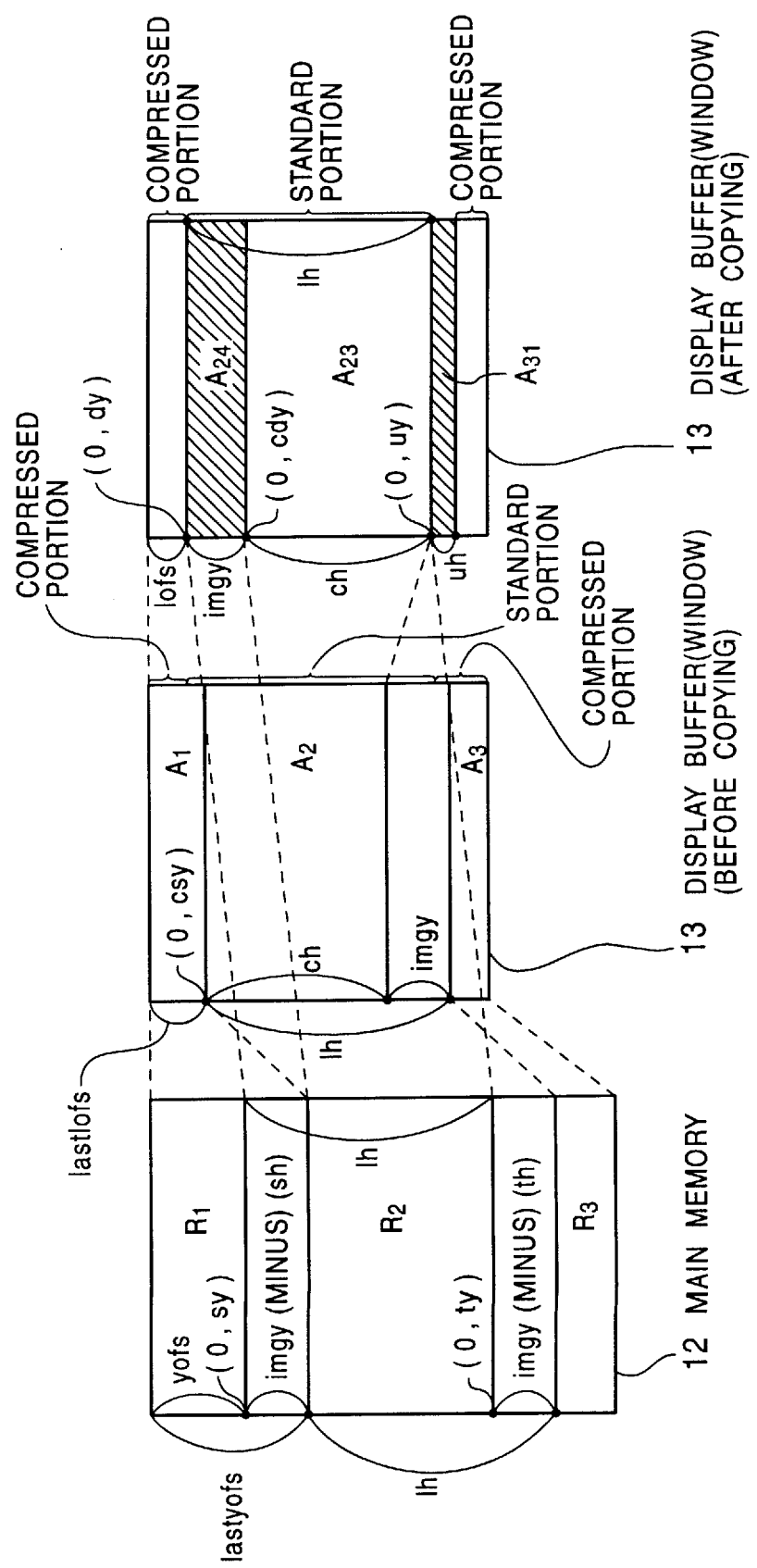
FIG. 21 is a diagram for explaining processing shown in FIG. 20.

In step S51 of this processing, lastlofs is set as a transfer-sourse coordinate csy in the area copying processing section 22, as shown in FIG. 21. That is, lofs in the preceding display buffer 13 area is set. Also, lh+imgy is set as a transfer range ch. Since imgy is negative (−) as mentioned above, the transfer range is defined by subtracting a lower range imgy from the range lh from csy.

Also, lofs−imgy is set as a transfer-destination coordinate cdy. Since imgy is negative as mentioned above, a top transfer-destination coordinate is actually set as a point which is lower by imgy than the coordinate lofs in the display buffer 13, as shown in FIG. 21.

The area copying processing section 22 is then instructed to operate. Data written in the range ch from lastlofs in standard-display area $A_2$ in the display buffer 13 is thereby moved and copied into the area in the range ch from cdy in the display buffer, thereby forming an image in a standard/display area $A_{23}$.

Next, in step S52, yofs in the main memory 12 is set in the image data transfer section 20 as a transfer-source coordinate sy, as shown in FIG. 21. Also, −imgy is set as a transfer range sh. In this case, since imgy is negative, the range sh is a positive range. Further, lofs is set as a transfer-destination coordinate dy.

The image data transfer section 20 is then instructed to operate. Data is the range imgy from yofs in the main memory 12 is thereby transferred into the area in the range imgy from lofs in the display buffer 13, thereby forming an image in an upper standard-display area $A_{24}$. A standard image is formed of the image in area $A_{23}$ transferred in step S51 and the image in area $A_{24}$ transferred in step S52.

Next, in step S53, yofs+lh is set as a transfer-source coordinate ty in the image data compression and transfer section 21. That is, a coordinate of a lower compressed-display area $R_3$ defined this time in main memory 12 is set. Also, −imgy is set as a transfer range th. Since imgy is negative as mentioned above, a positive range is essentially designated as range th.

Further, lofs+lh is set as a transfer-destination coordinate uy. Also, lastlofs−lofs is set as a transfer-destination range uh.

That is, the bottommost coordinate of the standard-display area $A_{23}$ is set as a transfer-destination coordinate and the range uh is defined from this coordinate.

The image data compression and transfer section 21 is instructed to operate. Data in the range imgy from yofs+lh in the main memory 12 is thereby transferred to the range uh from lofs+lh in the display buffer 13, thereby completing a compressed image in area $A_{31}$ indicated by hatching in FIG. 21. To form an image in the other compressed-display area, part of the preceding compressed image in area $A_3$ is directly used.

As described above, an upper portion of one frame of image is displayed as a standard image according to an upward movement of cursor 61, so that, in comparison with the entire preceding image, the image area in the upper compressed-display area $A_1$ is reduced while the image area in the lower compressed-display area $A_3$ is increased.

Also in this case, moving and copying the standard portion is first executed like the processing in steps S41 to S43 shown in FIG. 18, so that an image portion seen most carefully is first displayed to enable the content to be fast recognized. Also, the amount of data read out from the main memory 12 and processed is reduced, so that the display can be speedily completed (updated).

Referring back to FIG. 8, when the processing of step S18 is completed, the process moves to step S13 to set yofs as lastyofs. The process then returns to step S5 to repeat the subsequent processing.

If it is determined in step S17 that imgy is not negative, imgy is 0 after all. In this case, there is no need to change the displayed position, the process therefore returns from step S13 to step S5 to without performing any particular processing, and the subsequent processing is thereafter repeated.

Figure 22:
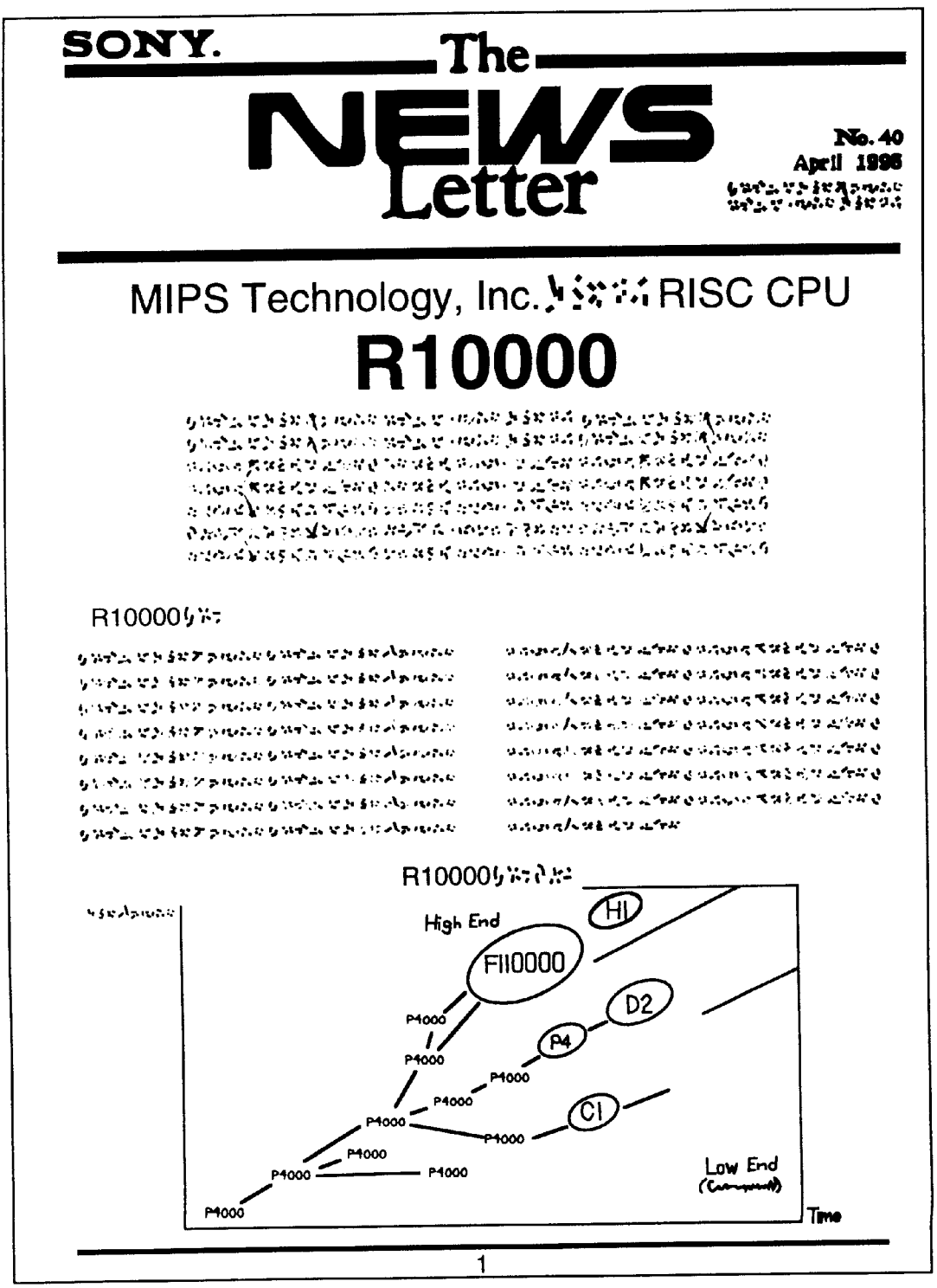
FIG. 22 is a diagram showing an original image.
Figure 23:
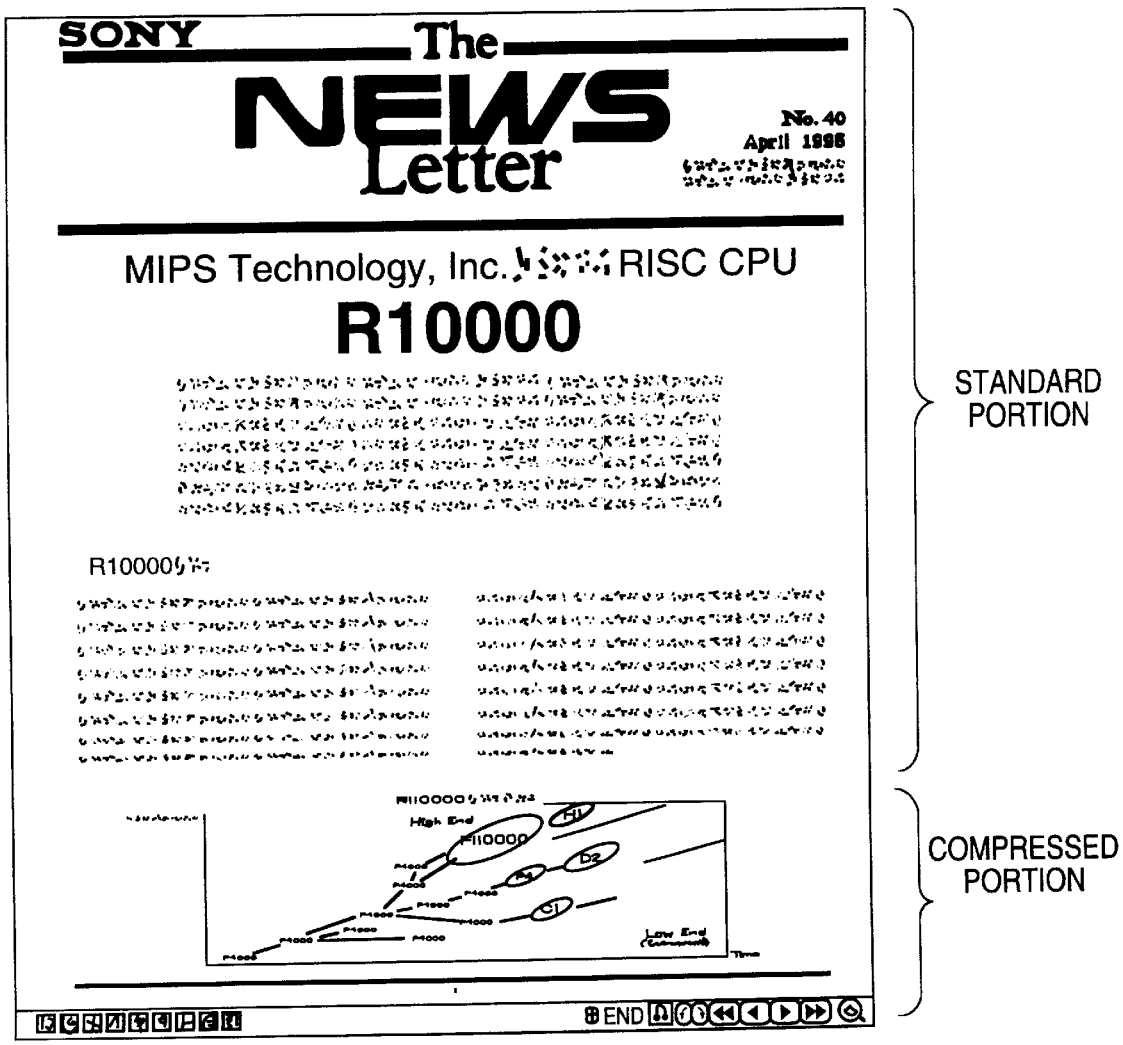
FIG. 23 is a diagram showing a state of the image of FIG. 22 displayed in a window.
Figure 24:
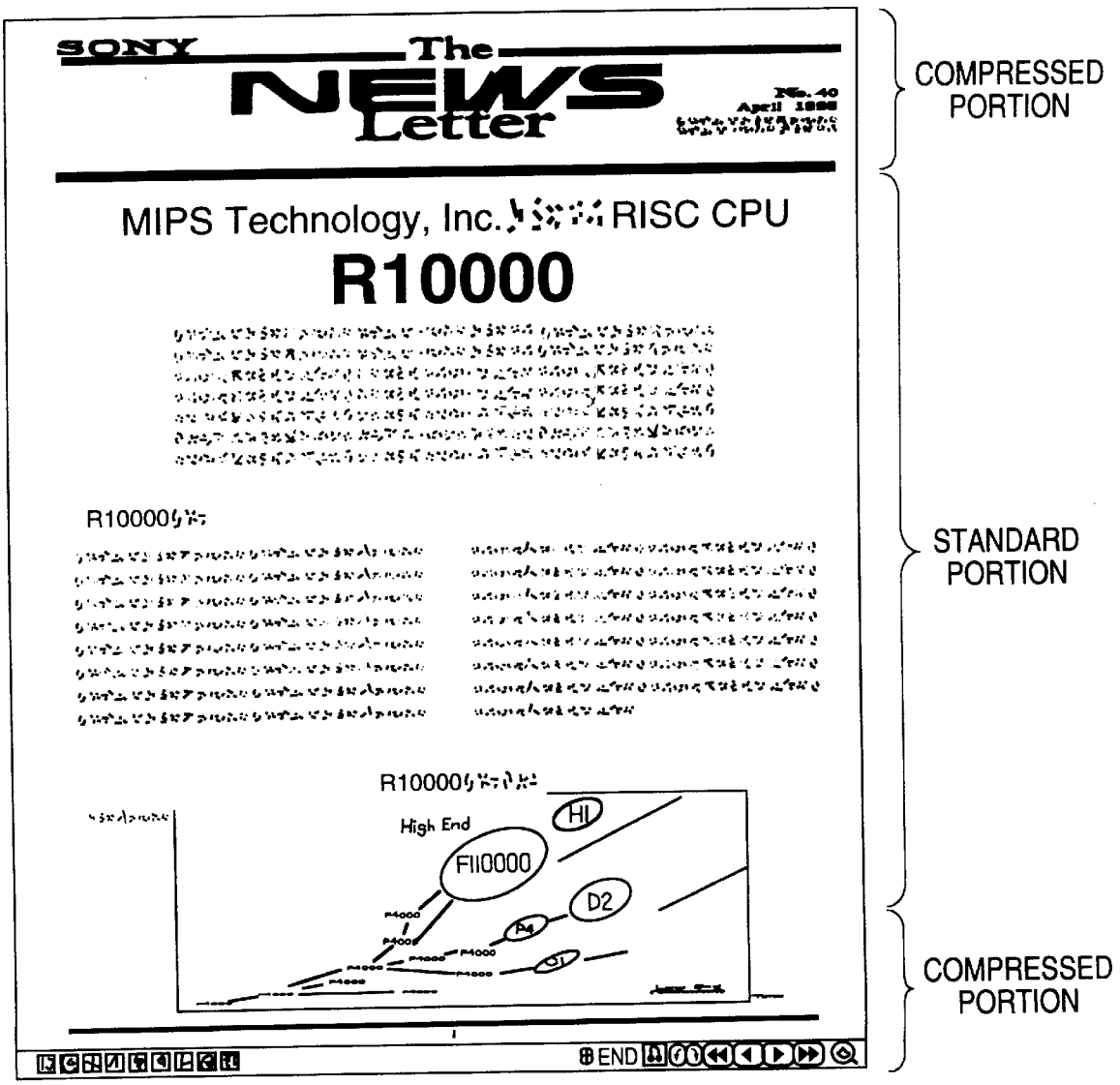
FIG. 24 is a diagram showing another state of the image of FIG. 22 displayed in the window.

If the above-described processing is executed, for example, with respect to one frame (page) of image shown in FIG. 22, this image is displayed as shown in FIG. 23, for example. In the state shown in FIG. 23, the standard portion of the image is at the uppermost position (the compressed portion above the standard portion is reduced to naught). If from this state cursor keys 17A or pointing device 16 is operated to downwardly move cursor 61, the displayed state is changed as shown in FIG. 24. In this case, compressed portions are displayed above and below the standard portion.

As is apparent from comparison of FIGS. 23 and 24 with FIG. 22, the entire frame of image is displayed in each of FIGS. 23 and 24. The cursor is vertically moved to enable any target portion of the image to be seen in the correct ratio. Further, even in the compressed portion, letters can be recognized if they are sufficiently large. Consequently, the possibility of oversight in searching one frame of image for predetermined information is reduced.

Figure 25:
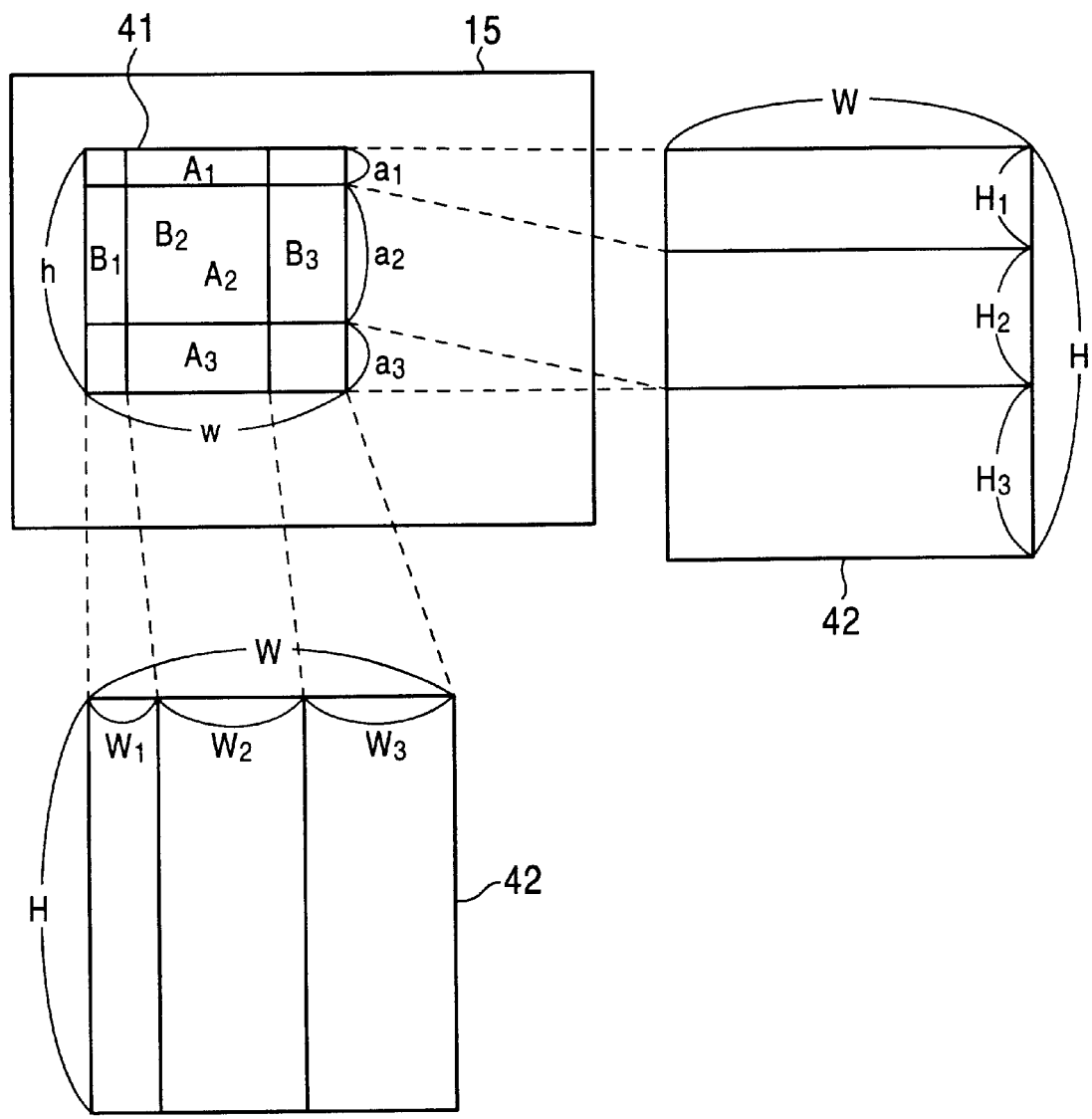
FIG. 25 is a diagram for explaining the principle of another example of display in accordance with the present invention.
Figure 26:
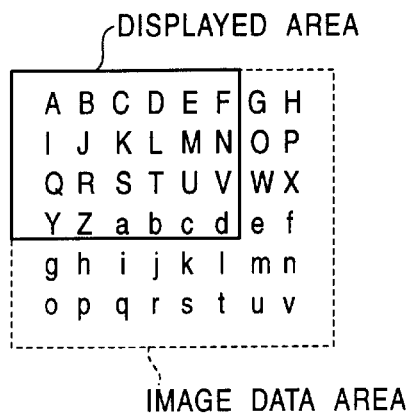
FIG. 26 is a diagram showing an image data area and a displayed area.
Figure 27:
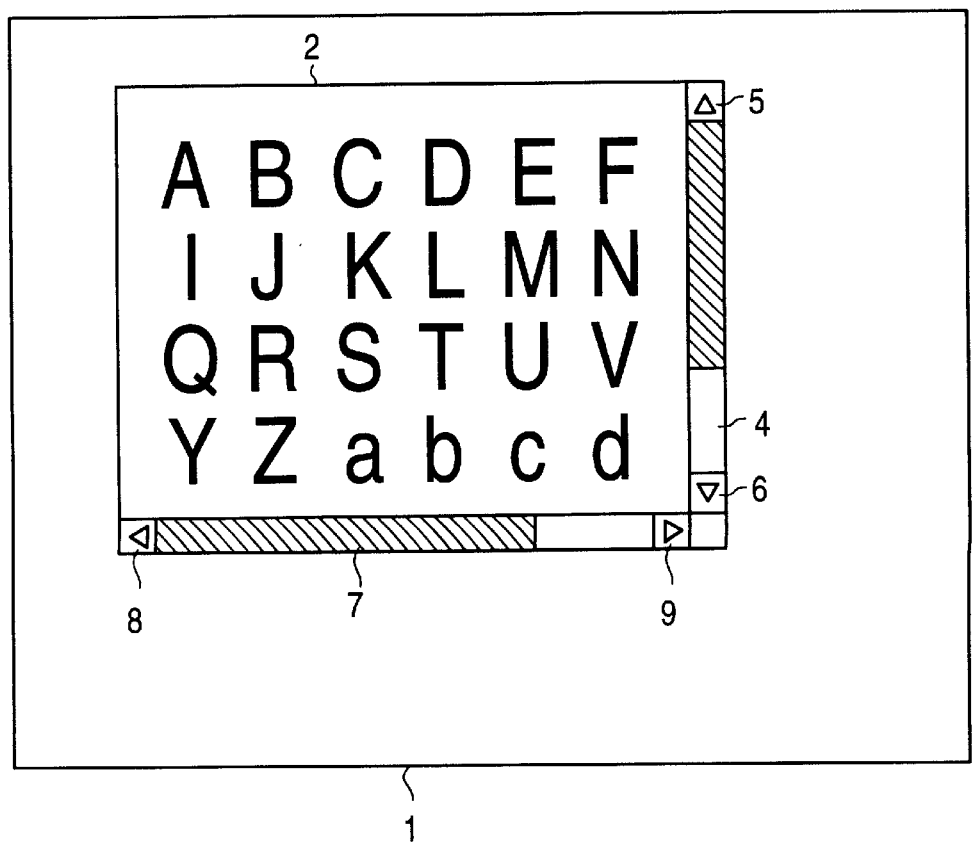
FIG. 27 is a diagram showing the principle of an example of conventional display.
Figure 28:
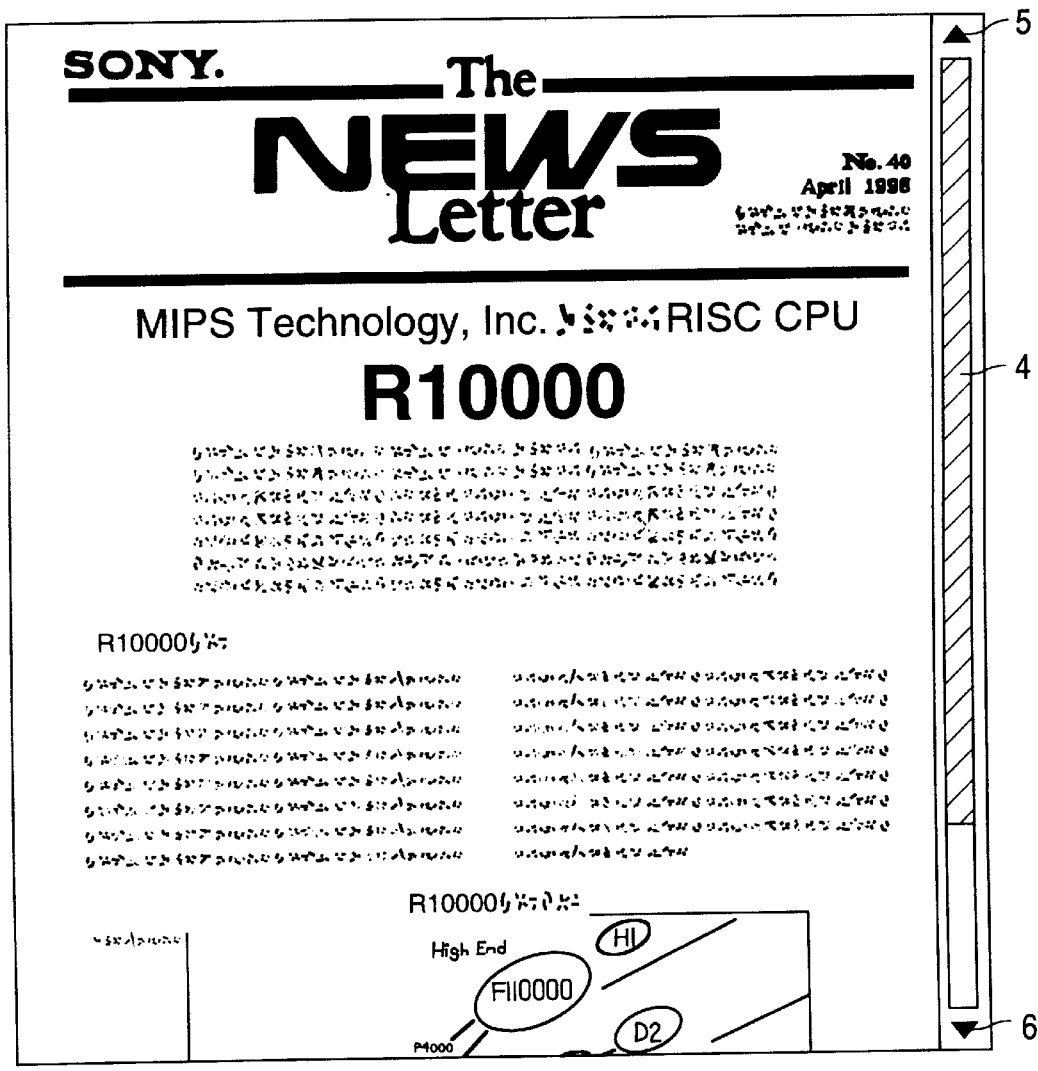
FIG. 28 is a diagram showing an example of conventional display.

In the above-described embodiment, image data 42 is compressed by adjusting the with W in the horizontal direction to the width w of window 41 and is further compressed only in the vertical direction. However, image data may be compressed in any other way. For example, as shown in FIG. 25, image data 42 is horizontally divided into three sections respectively having widths $W_1$, $W_2$, and $W_3$ without being entirely compressed by adjusting the width W to the width w of window image data 42. The section of width $W_1$ is compressed in the horizontal direction to be displayed in an area $B_1$ of window 41, the section of width $W_2$ is displayed in an area $B_2$ without being compressed in the horizontal direction, and the section of width $W_3$ is compressed in the horizontal direction to be displayed in an area $B_3$. Also, needless to say, image data 42 may be compressed only in the horizontal direction.

In the above-described embodiment, bit-map data is displayed. However, the kind of data displayed is not limited to bit-map data.

In the above-described image display controller and image display control method, if at least one of the lengths of one frame of image in the vertical and horizontal directions is longer than the length of a window in the corresponding direction, at least a portion of one frame of image is compressed so that the entire frame of image can be displayed in the window while the other portion is not compressed. If the image is displayed in this manner, it is possible to grasp a target image portion immediately and accurately while selecting the desired observation area in the entire area. Since the entire image is displayed, the possibility of overlooking an information content is reduced.

What is claimed is:

1. An apparatus for controlling a display of one frame of an image having a predetermined size in a window, said apparatus comprising:

comparison means for comparing at least one of a length in the vertical direction and a length in the horizontal direction of one frame of an image with a length of the window in the corresponding direction;

compression means for adjusting said at least one length of the frame to the length of the window in the corresponding direction by compressing at least a portion of the frame in the direction of said at least one length if said at least one length of the frame is larger than the length of the window in the corresponding direction, the other portion of the frame being not compressed in the corresponding direction; and output means for outputting the frame having the at least one portion compressed by said compression means and the other portion not compressed by said compression means.

2. An apparatus according to claim 1, wherein said compression means compresses an area of the frame having a length i a predetermined ratio to the length of the window in the corresponding direction.

3. An apparatus according to claim 1, further comprising designation means for designating an area not compressed by said compression means.

4. An apparatus according to claim 3, wherein the area not compressed by said compression means is centered on a point designated by said designation means.

5. An apparatus according to claim 4, wherein said designation means sets the point with a cursor.

6. An apparatus according to claim 1, further comprising adjustment means for compressing the entire frame in the direction other than the direction in which at least one portion of the frame is compressed so that the length of the frame in the corresponding direction is adjusted to the length of the window in the corresponding direction.

7. An apparatus according to claim 1, wherein, if the length of the frame in the direction in which at least one portion of the frame is to be compressed is pageh; a length of the area not compressed is Ih; and a length of the window in the corresponding direction is dh, said compression means compresses at least one portion of the frame in a ratio of (dh–Ih)/(pageh–Ih).

8. A method of controlling display of one frame of an image having a predetermined size in a window, said method comprising the steps of:

comparing at least one of a length in the vertical direction and a length in the horizontal direction of one frame of an image with a length of the window in the corresponding direction; and displaying the entire frame in the window by compressing at least a portion of the frame in the direction of said at least one length if said at least one length of the frame is larger than the length of the window in the corresponding direction, the other portion of the frame being not compressed in the corresponding direction.

9. An apparatus for controlling a display of an image having a predetermined size in a window, the apparatus comprising:

a comparison software module for comparing at least one of a vertical and a horizontal dimension of an image with a corresponding dimension of a window;

a compression software module for adjusting the dimension of the image to the corresponding dimension of the window by compressing one or more portions of the image in the direction of the compared dimension if the compared dimension of the image is larger than the corresponding dimension of the window, wherein at least one portion of the image is not compressed in the corresponding dimension; and a display for outputting the image including the portion compressed by the compression software module and the portion not compressed by the compression software module.

10. The apparatus claim 9, wherein the compression software module compresses an area of the image having a dimension i a predetermined ratio to the corresponding dimension of the window.

11. The apparatus of claim 9, further comprising a designation software module for designating an area not compressed by the compression software module.

12. The apparatus of claim 11, wherein the area not compressed by the compression software module is centered on a point designated by the designation software module.

13. The apparatus of claim 12, wherein the designation software module sets the point with a cursor.

14. The apparatus of claim 9, further comprising an adjustment software module for compressing the entire image in the dimension other than the dimension in which at least one portion of the frame is compressed, such that the image fits within the corresponding dimension of the window.

15. The apparatus of claim 9, wherein, if the dimension of the image in which at least one portion of the frame is compressed is pageh, a dimension of the area not compressed is lh, and a corresponding dimension of the window is dh, the compression software module compresses at least one portion of the image in a ratio of (dh–lh)/(pageh–lh).

16. The apparatus of claim 9 wherein the vertical dimension of the image is larger than the corresponding dimension of the window.

17. The apparatus of claim 9 wherein the horizontal dimension of the image is larger than the corresponding dimension of the window.

18. A method of controlling display of one frame of an image having a predetermined size in a window, the method comprising the steps of:

comparing a height of a frame of an image with a height of a window;

comparing a width of a frame of an image with a width of a window; and displaying the entire frame in the window by compressing one or more portions of the height of the frame if the height of the frame is larger than the height of the window wherein at least one portion of the height remains not compressed in a vertical direction.

19. The method of claim 18 wherein the height of the frame is smaller than the height of the window and wherein the method further comprises the step of:

displaying the entire frame in the window by compressing one or more portions of the width of the frame if the width of the frame is larger than the width of the window wherein at least one portion of the width remains not compressed.

20. The method of claim 18 further comprising the step of:

displaying the entire frame in the window by compressing one or more portions of the width of the frame if the width of the frame is larger than the width of the window wherein at least one portion of the width remains not compressed in a horizontal direction.

* * * * *